US010860555B2

(12) United States Patent
Ippatapu

(10) Patent No.: US 10,860,555 B2
(45) Date of Patent: Dec. 8, 2020

(54) METHOD AND APPARATUS FOR TWO TIER DATA DEDUPLICATION USING WEIGHTED GRAPHS

(71) Applicant: DELL PRODUCTS, LP, Round Rock, TX (US)

(72) Inventor: Venkata L R Ippatapu, Westborough, MA (US)

(73) Assignee: Dell Products, L.P., Round Rock, TX (US)

(*) Notice: Subject to any disclaimer, the term of this patent is extended or adjusted under 35 U.S.C. 154(b) by 170 days.

(21) Appl. No.: 16/113,477

(22) Filed: Aug. 27, 2018

(65) Prior Publication Data

US 2020/0065406 A1 Feb. 27, 2020

(51) Int. Cl.
*G06F 3/06* (2006.01)
*G06F 16/215* (2019.01)
*G06F 16/901* (2019.01)

(52) U.S. Cl.
CPC .......... *G06F 16/215* (2019.01); *G06F 3/0613* (2013.01); *G06F 3/0659* (2013.01); *G06F 3/0677* (2013.01); *G06F 16/9024* (2019.01)

(58) Field of Classification Search
CPC .. G06F 16/215; G06F 16/9024; G06F 3/0677; G06F 3/0659; G06F 3/0613; G06F 17/30; G06F 3/06
USPC ........................................................ 707/692
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 5,968,369 A | 10/1999 | Anderson et al. | |
| 7,054,883 B2 | 5/2006 | Meiri et al. | |
| 7,996,636 B1* | 8/2011 | Prakash | G06F 3/0619 711/162 |
| 8,082,231 B1 | 12/2011 | McDaniel et al. | |
| 8,639,669 B1 | 1/2014 | Douglis et al. | |
| 8,712,963 B1 | 4/2014 | Douglis et al. | |
| 9,116,858 B1* | 8/2015 | Yokoi | G06F 15/17331 |
| 9,665,305 B1 | 5/2017 | Natanzon et al. | |
| 9,891,860 B1* | 2/2018 | Delgado | G06F 3/065 |
| 10,037,336 B1 | 7/2018 | Hu et al. | |
| 10,645,158 B1 | 5/2020 | Ippatapu | |
| 2007/0085716 A1* | 4/2007 | Bar-Yossef | G06F 16/90344 341/87 |

(Continued)

OTHER PUBLICATIONS

U.S. Appl. No. 15/958,556, filed Apr. 20, 2018.

(Continued)

*Primary Examiner* — Hicham Skhoun
(74) *Attorney, Agent, or Firm* — Larson Newman, LLP

(57) ABSTRACT

A method of improving a data storage system includes dividing input/output (I/O) data into a plurality of blocks, and deduplicating the I/O data to produce deduplicated I/O data. The deduplication includes determining whether a first block is a duplicate block of another one of the blocks, and in response to determining that the first block is a duplicate block, replacing the duplicate block with a reference to the first block. The method determines whether the first block has a maximum overlapping area of duplicate data with a particular one of the blocks that is not a duplicate block, and replaces the particular block with a reference to the first block and to non-overlapping data.

19 Claims, 13 Drawing Sheets

(56) References Cited

U.S. PATENT DOCUMENTS

| | | | |
|---|---|---|---|
| 2008/0307120 A1* | 12/2008 | Ogawa | G06F 11/1461 |
| | | | 710/19 |
| 2009/0307251 A1 | 12/2009 | Heller et al. | |
| 2013/0212074 A1* | 8/2013 | Romanski | G06F 12/0253 |
| | | | 707/692 |
| 2014/0258244 A1 | 9/2014 | Rao et al. | |
| 2014/0330793 A1 | 11/2014 | Chamness | |
| 2014/0330797 A1 | 11/2014 | Lumb | |
| 2016/0042008 A1* | 2/2016 | Tripathy | G06F 16/1744 |
| | | | 707/692 |
| 2016/0350324 A1 | 12/2016 | Wang et al. | |
| 2016/0366226 A1* | 12/2016 | Friedman | G06F 3/0608 |
| 2017/0131934 A1 | 5/2017 | Kaczmarczyk et al. | |
| 2017/0153829 A1* | 6/2017 | Patel | G06F 3/0619 |
| 2017/0199820 A1 | 7/2017 | Romanovskiy | |
| 2018/0011871 A1 | 1/2018 | Kroll et al. | |
| 2018/0307433 A1 | 10/2018 | Takaoka et al. | |
| 2018/0365159 A1 | 12/2018 | Nakata | |

OTHER PUBLICATIONS

P.F. Windley, et al., "Binary Search Tree," Retreived from https://en.wikipedia.org/w/index.php?title=Binary_search_tree&oldid=801134990, Sep. 17, 2017.

Venkata L. R. Ippatapu, et al., U.S. Appl. No. 15/879,813, filed Jan. 25, 2018, "Data Replication Using Deduplication and Synchronized Hash Tables".

* cited by examiner

METHOD AND APPARATUS FOR TWO TIER DATA DEDUPLICATION USING WEIGHTED GRAPHS

CROSS-REFERENCE TO RELATED APPLICATION

Related subject matter is contained in co-pending U.S. patent application Ser. No. 15/958,556 entitled "Multi-Granular Data Reduction for Remote Data Replication," filed on Apr. 20, 2018, the disclosure of which is hereby expressly incorporated by reference in its entirety.

FIELD OF THE DISCLOSURE

The present disclosure generally relates to information handling systems, and more particularly relates to two-tier data deduplication using weighted graphs for maximum data reduction of host data for storage systems.

BACKGROUND

Computer systems may include different resources used by one or more host processors. Resources and host processors in a computer system may be interconnected by one or more communication connections. These resources may include, for example, data storage devices such as those included in the data storage systems manufactured by Dell EMC®. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using a data storage system. For example, a host processor may perform basic system input/output (I/O) operations in connection with data requests, such as data read and write operations.

Host systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts, and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. For example, in some implementations, a local or source data site may be configured in a partner relationship with a remote or destination source data site. The remote data site includes a mirror or copy of the data in the local data site. Such mirroring may be used for a variety of reasons including reducing the likelihood of data loss. Mirroring is a form of replication, in which data on the first storage device is replicated on the second storage device.

The time it takes to perform data replication depends in part on the time it takes to transmit the data being replicated between the primary data site and remote data site, and the time it takes to transmit the data being replicated depends in part on the size of the data. Thus, it may be desirable to reduce the size of the data being replicated (without losing any data) to reduce data replication times.

SUMMARY

A method of improving a data storage system includes dividing input/output (I/O) data into a plurality of blocks, and deduplicating the I/O data to produce deduplicated I/O data. The deduplication includes determining whether a first block is a duplicate block of another one of the blocks, and in response to determining that the first block is a duplicate block, replacing the duplicate block with a reference to the first block. The method determines whether the first block has a maximum overlapping area of duplicate data with a particular one of the blocks that is not a duplicate block, and replaces the particular block with a reference to the first block and to non-overlapping data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
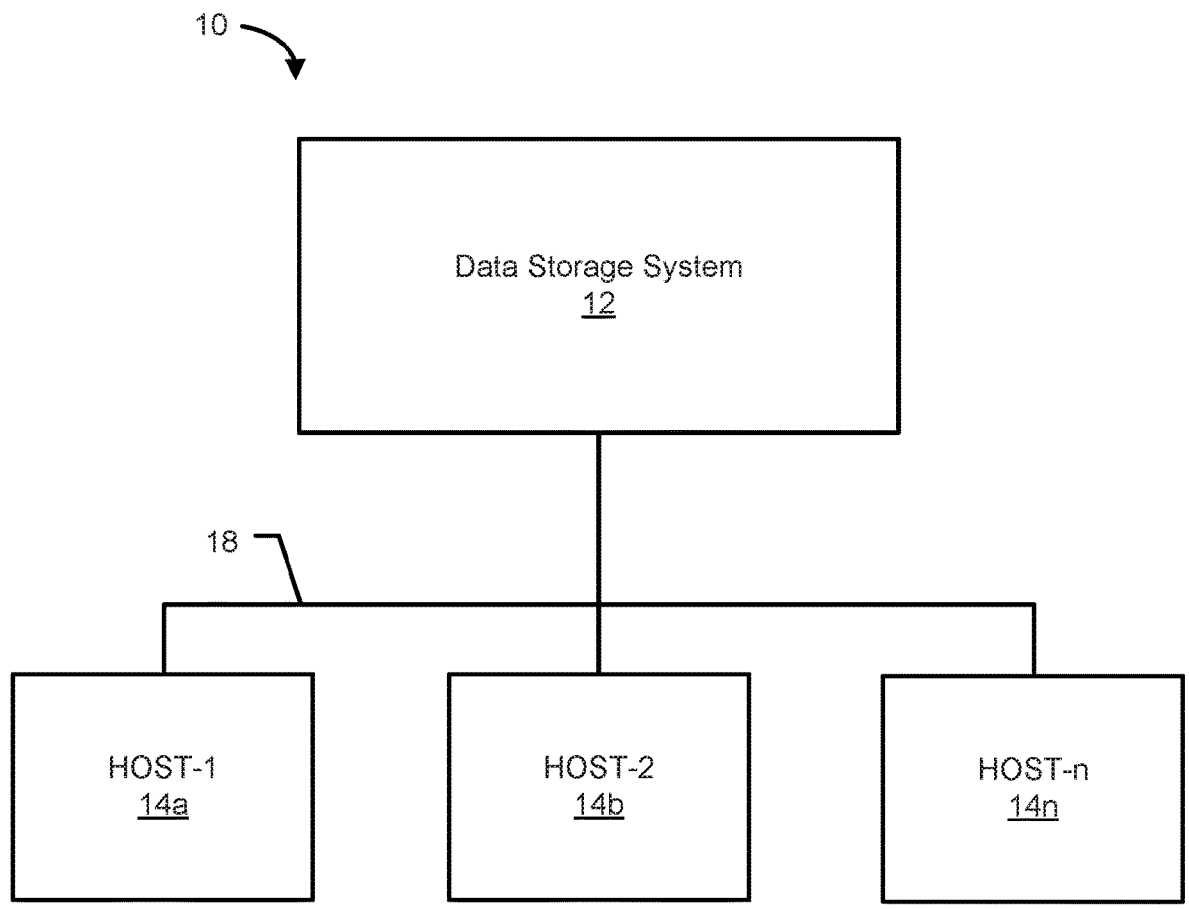
FIG. 1 is an example of an embodiment of a computer system, according to at least one embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Described herein is a system and techniques for performing multi-granular data reduction, including deduplication, on I/O data received from a host to a data storage system, for example, as part of replicating the data at another data storage system. Deduplication may be performed in a multi-tier fashion, on blocks of the I/O data. For example, the I/O data may be divided into blocks of a predetermined size (512 bytes, 1024 bytes, etc.). The blocks may be ordered, for example, in an order corresponding to the order of the bits of the I/O data grouped into the blocks. Deduplication is performed on the blocks by comparing each block to the other blocks (in a defined order) in the I/O data to determine if there is a match. These comparisons may involve calculating (if one is not provided in the I/O data) and/or comparing fingerprints, for example, cyclic redundancy check (CRC) values, of each block. If a duplicate block (that is, a match) is determined for a block, the block may be replaced with a reference to the duplicate block, the reference being relative to the position of the duplicate block within the I/O data. This reference may be part of a deduplication block header (deduplication header) generated for the block. A deduplication header may be generated for each block for which any deduplication is performed (for example, at any deduplication level or tier as described herein) and possibly updated (for example, for different deduplication levels or tiers). The deduplication performed on the highest level block may be referred to herein as a first level or tier-1. Deduplication may be performed at a second level or tier-2. At tier-1, deduplication may be performed on identical blocks of data. At tier-2, deduplication may be performed on similar blocks of data. Similar blocks of data are blocks of data that includes subsets of redundant data and non-redundant data. The resulting data after multi-level deduplication has been performed may be referred to herein as deduplicated I/O data (deduplicated data).

In some embodiments, the deduplicated data may be compressed. The compressed deduplicated data may also be referred to as reduced I/O data (reduced data). The reduced data may be transmitted to a second potentially remote data storage system as part of replicating the I/O data. Reduced data is the I/O data that has at least been deduplicated, and for which the deduplicated data may have been compressed. In some embodiments, in addition to maintaining a deduplication header for each block, a deduplication metadata header (metadata header) may be maintained for the I/O data. The deduplication header and the metadata header may be transmitted along with the reduced data to a second data storage system as part of replicating the I/O data. An indication of the original size of the I/O data before being reduced (that is, by deduplication, and compression if any) may be transmitted along with the reduced data to the second data storage system as well. For example, information about the deduplicated I/O data such as original data size of the I/O data and size of the deduplicated data may be included in I/O related metadata information. The I/O related metadata information along with the metadata header and the deduplicated I/O data are transmitted to the second data storage system which may also be referred to as replicating data storage system. The I/O related metadata information is distinct from information in the metadata header. The replicating storage device may restore the original I/O data from the reduced I/O data. This restoring may involve determining the original I/O size from the original size information, and then using the metadata header and deduplication header as described in more detail below to determine and restore blocks (for example, duplicate or similar blocks), and placing the restored I/O data in a buffer. The replicating storage system then may perform other operations on the restored I/O data.

By performing granular multi-level deduplication on I/O data, there is a greater likelihood that duplicates will be found, and thus the I/O data reduced, which results in less data being transmitted to a replicating storage system. Less data being transmitted results in faster replication times and a reduction in overall network bandwidth consumption. Compressing the deduplicated data further reduces the I/O data size, resulting in even faster storage times and less network bandwidth consumption which is beneficial as there is always a greater demand and necessity to reduce network bandwidth usage and at the same time replicate as much host data as possible.

Examples of embodiments of the present disclosure will now be described in more detail with reference to the drawings. Some of the embodiments described herein use an example of a maximum potential I/O size of 2 KB and a maximum block size of 512 bytes. It should be appreciated that these examples are for illustrative purposes and the present disclosure is not so limited.

FIG. 1 is an example of an embodiment of a computer system 10, according to at least one embodiment of the invention. Other embodiments of a computer system, for example, variations of the computer system 10, are possible and are intended to fall within the scope of the invention. The computer system 10 includes a data storage system 12 connected to host systems 14a-14n (host systems 14) through a communication medium 18. Other embodiments of a data storage system 12 are possible and are intended to fall within the scope of the disclosure. The data storage system 12 of FIG. 1 may contain one or more interconnected data storage systems which may be manufactured by one or more different vendors. Each of the interconnected data storage systems may be resources included in an embodiment of the computer system 10 of FIG. 1 to provide storage services to, for example, host systems 14.

In this embodiment of the computer system 10, the N hosts 14a-14n may access the data storage system 12, for example, in performing I/O operations or data requests through the communication medium 18. The processors included in the host systems 14 may be any one of a variety of proprietary or commercially available single or multi-processor system, such as an Intel-based processor, or another type of commercially available processor able to support traffic in accordance with each particular embodiment and application.

The communication medium 18 may use any one or more of a variety of networks or another type of communication connections as known to those skilled in the art. The type of communication connection used may vary with certain system parameters and requirements, such as those related to bandwidth and throughput required in accordance with a rate of data requests as may be issued by the host systems 14. The communication connection may be a network connection, bus, and/or another type of data link, such as a hardwire or other connections known in the art. For example, the communication medium 18 may use the internet, an intranet, network or other wireless or other hardwired connection(s) by which the host systems 14 may access and communicate with the data storage system 12, and also may communicate with data storage systems that may be included in the computer system 10.

The communication medium 18 may use a variety of different communication protocols such as small computer system interface (SCSI), enterprise systems connection (ES-CON), Fibre Channel, internet small computer system interface (iSCSI), or Gigabit Ethernet (GigE), and the like. Some or all of the connections by which the host systems 14 and the data storage system 12 may be connected to the communication medium 18 may pass through other communication devices, such as switching equipment, a phone line, a repeater, a multiplexer or even a satellite.

Each of the host computers 14a-14n and the data storage system 12 may all be located at the same physical site or may be in different physical locations. Each of the host computers 14a-14n may perform different types of data operations in accordance with different tasks and applications executing on the host computers 14a-14n. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

The data storage system 12 is a multi-level inline data deduplication system. Because of the issue of increasing demand and necessity to reduce network bandwidth and usage, a solution that reduces network bandwidth usage and at the same time replicates as much host data as possible is needed. The multi-level approach maximizes the reduction of the I/O data in comparison to typical data deduplication or data comparison techniques alone. For example, the current disclosure has remarkable superiority in reducing data length and increasing data savings ratio. Further, the current disclosure is a cost-effective solution for inline deduplication systems. Most of the prior technology used post-processing deduplication or deduplication for back-end storage data reduction and relied on external devices such as Riverbed/Exida® for data deduplication which is expensive. Also, in addition to achieving greater performance than typical remote data facility (RDF) replication systems, the current disclosure is an effective alternative solution to data compression for data replication systems.

Each of the data storage systems may include a plurality of physical non-volatile storage devices arranged in n rows of disks or volumes. Each row of disks or volumes may be connected to a disk adapter or director responsible for the backend management of operations to and from a portion of the disks or volumes. A single disk adapter may be responsible for the management of a row of disks or volumes. The data storage systems may also include one or more host adapters (HAs) or directors to manage communications and data operations between one or more host systems and the global memory. In an embodiment, the HA may be a Fibre Channel Adapter or another adapter which facilitates host communication.

The data storage systems may also have a remote adapter (RA) including a processor used to facilitate communication between data storage systems, such as between two of the same or different types of data storage systems. In one embodiment, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix data storage systems. The RA may be used with Symmetrix Remote Data Facility (SRDF), a family of products (provided by Dell EMC, a division of Dell Inc.) that facilitate the data replication from one Symmetrix storage array to another through a storage area network or an IP network. SRDF logically pairs a device or a group of devices from each array and replicates data from one to the other synchronously or asynchronously. Performing remote data communications using SRDF over a TCP/IP network is described in more detail in U.S. patent application Ser. No. 09/995,464 entitled "Remote Data Facility Over an IP Network," by Veprinsky et al., filed on Nov. 22, 2005 (now U.S. Pat. No. 6,968,369) which is incorporated by reference herein. Generally, the SRDF products are one example of commercially available products that may be used to provide the functionality of remote data storage for use in an embodiment in connection with techniques herein. Data storage device communication between Symmetrix data storage systems using SRDF is described, for example, in U.S. patent application Ser. No. 08/654,511 entitled "Remote Data Mirroring," by Yanai et al., filed on May 28, 2996 (now U.S. Pat. No. 5,742,792), U.S. patent application Ser. No. 08/052,039 entitled "Data Storage System Controlled Remote Data Mirroring with Respectively Maintained Data Indices," by Yanai et al., filed on Apr. 23, 1993 (now U.S. Pat. No. 5,544,347), and U.S. patent application Ser. No. 10/724,669 entitled "Virtual Ordered Writes for Multiple Storage Devices," by Meiri et al., filed on May 30, 2006 (now U.S. Pat. No. 7,054,883), all of which are incorporated by reference herein.

One or more internal logical communication paths may exist between the DAs, the RAs, the HAs, and the memory. An embodiment may use one or more internal busses and/or communication modules. For example, the global memory portion may be used to facilitate data transfers and other communications between the DAs, HAs and RAs in a data storage system. In one embodiment, the DAs may perform data operations using a cache that may be included in the global memory, for example in communications with other disk adapters or directors, and other components of the data storage system. The other portion is that portion of memory that may be used in connection with other designations that may vary in accordance with each embodiment.

Data storage devices 24a through 24n may be any suitable storage devices such as rotating disk drives, flash-based storage, and the like. The particular data storage system as described in this embodiment, or a particular device thereof, such as a rotating disk or solid-state storage device (such as a flash-based storage device), should not be construed as a limitation. Other types of commercially available data storage systems, as well as processors and hardware controlling access to these particular devices, may also be included in an embodiment.

In some embodiments, write data received at the data storage system from a host or other client may be initially written to cache memory and marked as write pending. Once written to the cache memory, the host may be notified that the write operation has completed. At a later point time, the write data may be destaged from cache to the physical storage device, such as by a disk adapter.

The HAs may be used in connection with communications between a data storage system and a host system. The RAs may be used in facilitating communications between two data storage systems. The DAs may be used in connection with facilitating communications to the associated disk drive(s) and LUN(s) residing thereon.

An embodiment of the data storage system 12 may also include the concept of an RDF group in which one or more devices on a data storage system are associated with a particular group under the control of a single RA which services the devices included therein. Rather than have a single R1 device and a single R2 device, a grouping may be defined so that a source group of devices, such as on the data storage system 210, have corresponding target devices of a target group, such as devices on the data storage system 260. Devices in a source group may be mirrored in corresponding devices of a target group using SRDF functionality.

Figure 2:
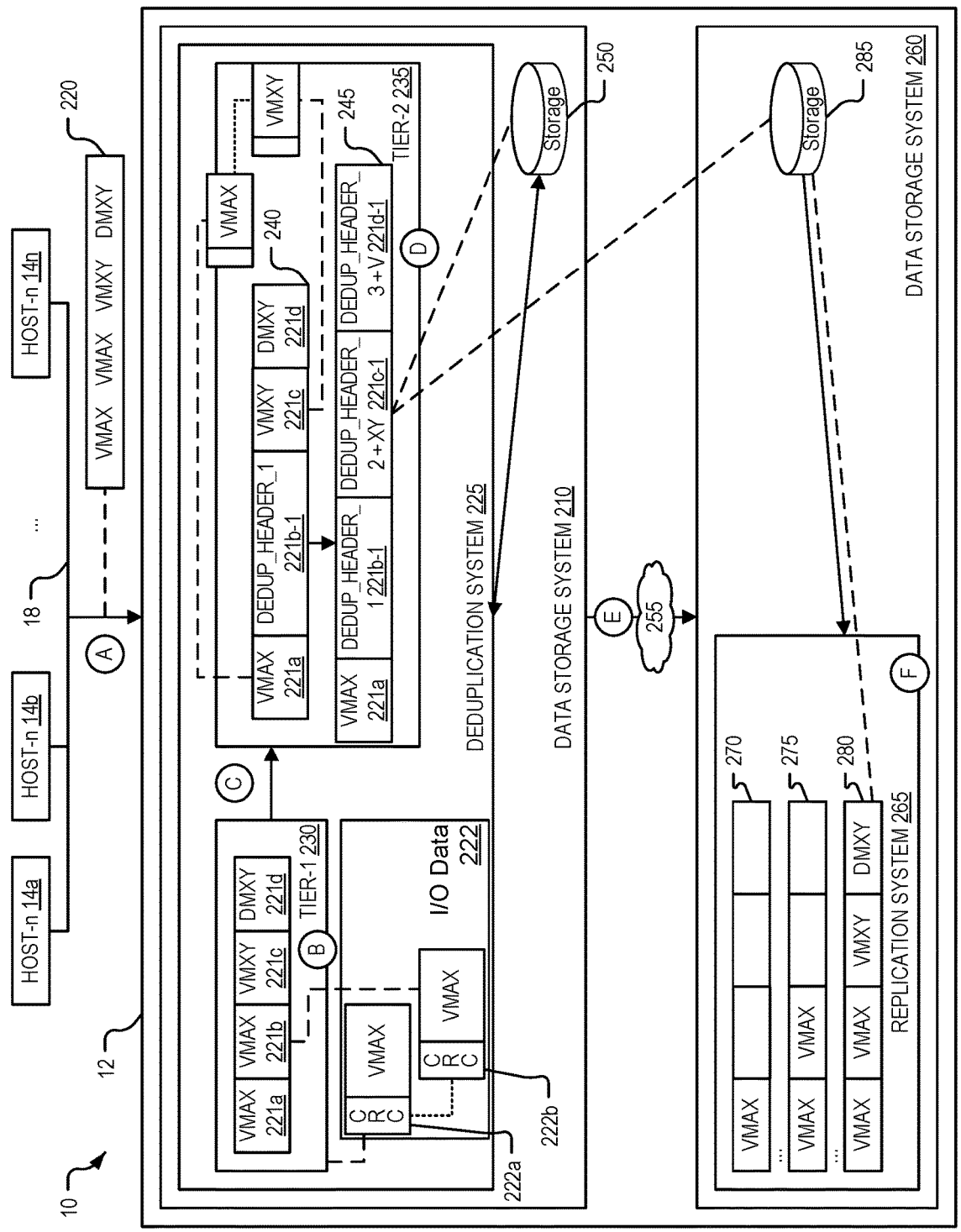
FIG. 2 is a more detailed illustration of the computer system, according to at least one embodiment of the present disclosure.

FIG. 2 shows the computer system 10 in greater detail. The computer system 10 includes the host systems 14 and the data storage system 12 which includes a data storage system 210 and a data storage system 260. As explained above, the host systems 14 and the data storage system 12 are connected through the communication medium 18. The data storage system 210 includes a storage device 250 and a deduplication system 225. The deduplication system 225 includes a tier-1 processor 230 and a tier-2 processor 235. The data storage system 260 includes a storage device 285 and a replication system 265. The data storage system 210 and the data storage system 260 are connected through a communication medium 255.

Each of the host computers 14a-14n may be a server device such as enterprise server, application server, email server, web server, content server, application server, etc. Alternatively, the host systems 14 may be a client device such as a desktop computer, a tablet, a smartphone, etc. In some arrangements, the host systems 14 include both server devices and client devices. The host systems 14 store and retrieve data from the data storage system 210.

Similar to the communication medium 18, the communication medium 255 may use a variety of different communication protocols such as SCSI, ESCON, Fibre Channel, iSCSI, or GigE, and the like and the connection may pass through communication devices such as switching equipment, a phone line, a repeater, a multiplexer or even a satellite.

In the embodiment of FIG. 2, any one of the host computers 14a-14n may issue a data request to the data storage system 210 to perform a data operation. For example, an application executing on one of the host computers 14a-14n may perform a read or write operation resulting in one or more data requests to the data storage system 210.

The data storage system 12 may be used to maintain data on a local data site and a remote data site. The local data site may also be referred to as a local data storage system or the first data storage system. The remote data site may also be referred to as a remote data storage system or the second data storage system. In this illustration, the data storage system 210 is the first data storage system while the data storage system 260 is the second data storage system. The data storage system 210 may be in the same physical site as the host systems 14. The data storage system 260 may be located remotely with respect to the host systems 14. For example, the distance between the data storage systems 210 and 260 may be 200 km or more.

The data storage system 210 may have one or more RAs included therein facilitating remote connections to the data storage system 260. Communications between the data storage system 210 and the data storage system 260 may be made over communication medium 255. The data storage system 260 may include one or more RAs for use in receiving the communications from the data storage system 210. The data storage systems 210 and 260 may communicate, for example, over Gigabit Ethernet connections supporting TCP/IP traffic. The SRDF replication functionality may be facilitated with the RAs provided at each of the data storage systems 210 and 260. In connection with SRDF, a single RDF link or path may be between an RA of the data storage system 210 and an RA of the data storage system 260. Techniques are described in more detail below for use in transmitting data over an RDF link, such as I/O traffic including write data in connection with performing remote data replication over the RDF link between the data storage systems 210 and 260.

Techniques herein may be used with SRDF, or more generally any RDF, operating in one or more different supported modes. For example, such modes may include SRDF operating in synchronous mode, asynchronous mode, or adaptive copy mode. For example, in connection with SRDF, one of the host computers 14a-14n may issue a write to an R1 device in a first data storage system and the data change is propagated to the R2 device in a second data storage system. As discussed in U.S. Pat. No. 5,544,347, SRDF can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first data storage system will not provide an indication to the host that the data operation is complete until the first data storage system receives an acknowledgment from the second data storage system regarding the I/O data for the R2 device. In contrast, in connection with the asynchronous mode, the host receives an acknowledgment from the first data storage system as soon as the information is committed to the first data storage system without waiting for an acknowledgment from the second data storage system.

In some embodiments, write data received at the data storage system 210 from one of the host computers 14a-14n may be initially written to a cache memory and marked as write pending. Once written to the cache memory, the host may be notified that the write operation has completed. At a later point time, the write data may be destaged from the cache to the physical storage device, such as by a disk adapter.

In some embodiments performing data replication operating in the asynchronous replication mode, an acknowledgment regarding completion of a host write from one of the host computers 14a-14n may be sent to the host from the data storage system 210 once the write data has been written to a data cache. Consistent with discussion elsewhere herein, the write data is subsequently destaged from the data cache to the storage device 250. Additionally, the write data is also transferred to the data storage system 260 where the write data is then written to a second data cache, and acknowledgement is returned from the data storage system 260 to the data storage system 210, and subsequently the write data is destaged from the second data cache and stored in the storage device 275.

FIG. 2 is annotated with a series of letters A-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, one of the host computers 14a-14n may issue a command, such as to write I/O data 220 to the data storage system 12 through the communication medium 18. When the data storage system 12 receives the I/O data 220, the data storage system 12 assigns the data storage system 210 to handle the issued write command. The data storage system 210 may write the I/O data 220 in its data cache prior to processing.

At stage B, the deduplication system 225 begins processing the I/O data 220. The deduplication system 225 may process the I/O data 220 using a two-tier approach. First, the I/O data is processed at the tier-1 processor 230. Generally, the I/O data is divided into a suitable number of blocks with associated per-block block-level metadata in accordance with the amount or size of the I/O data or data payload. I/O data 222 may represent the result after dividing the I/O data 220 into multiple 512-byte data blocks and additionally creating and associating per-block metadata with each such block. The tier-1 processor 230 deduplicates data blocks with the identical data payload. For example, the tier-1 processor 230 compares data payload in a data block 221a and data payload in a data block 221b. The tier-1 processor 230 may perform the comparison by determining whether CRC 222a matches CRC 222b. If the data payload in data block 221a is a duplicate of the data payload in the data block 221b, then the data block 221b is replaced by a reference to the data block 221a. This process continues until all identical data blocks in the I/O data 222 are replaced by a reference to a unique instance of the first occurrence of the identical data block. For example, deduplicated data 240 is shown as an example after the tier-1 processor 230 deduplicates the I/O data 222. The deduplicated data 240 may also be referred to herein as first-level or tier-1 deduplicated data 240.

At stage C, the deduplicated data 240 is transmitted to the tier-2 processor 235. The deduplicated data 240 also includes information such as references to the first unique occurrence of identical data blocks. The information is included in a deduplication header. For example, data block 221b-1 in the deduplicated data 240 is shown to include a deduplication header DEDUP_HEADER_1 which references the first unique occurrence of data payload (VMAX) instead of including the data payload (VMAX).

At stage D, the tier-2 processor 235 further deduplicates the deduplicated data 240. The tier-2 processor 235 deduplicates similar data payloads. Similar data payloads are not identical data payloads but include blocks with redundant data. The redundant data is a maximum overlapping area of duplicate data. For example, data payload in the data block 221a (VMAX) is similar to data payload in the block 221c (VMXY) because the data blocks 221a and 221c contain redundant data payload (VM). The data block 221c is replaced by a reference to the unique instance of the first occurrence of redundant data payload (the data block 221a). This process continues until all redundant data payloads in the other data blocks are replaced by references. A deduplicated data block 245 is an example data block after the tier-2 processor further deduplicates the deduplicated data 240. The deduplicated data 245 may be then stored in the storage device 250. The deduplicated data 245 may also be referred to herein as second level, tier-2 deduplicated data, or final deduplicated data.

At stage E, a copy of the deduplicated data 245 is transmitted to the data storage system 260 via the communication medium 255. In this example, the storage device 285 is in a different location than the storage device 250 such that if the storage device 250 becomes inoperable, any one of the host computers 14a-14n may resume operation using data in the storage device 275. With SRDF, a user may denote a first storage device, such as the storage device 250, as a master storage device and a second storage device, such as the storage device 285, as a slave storage device. Other incarnations of SRDF may provide a peer to peer relationship between the local and remote storage devices. In one example, the host systems 14 may interact directly with the storage device 250, but any data changes made are automatically provided to the storage device 275 using SRDF. In operation, any one of the host systems 14 may read and write data using the storage device 250, and SRDF may handle the automatic copying and updating of data from the storage device 250 to the storage device 285.

At stage F, the replication system 265 allocates a buffer the size of the original I/O data (the I/O data 220). The replication system 265 may restore every duplicate and redundant data payload using the first occurrence of the duplicate or redundant data payload that is referenced in the deduplication header. This process continues until all the data blocks are restored. Restored data 280 is shown as an example.

Figure 3A:
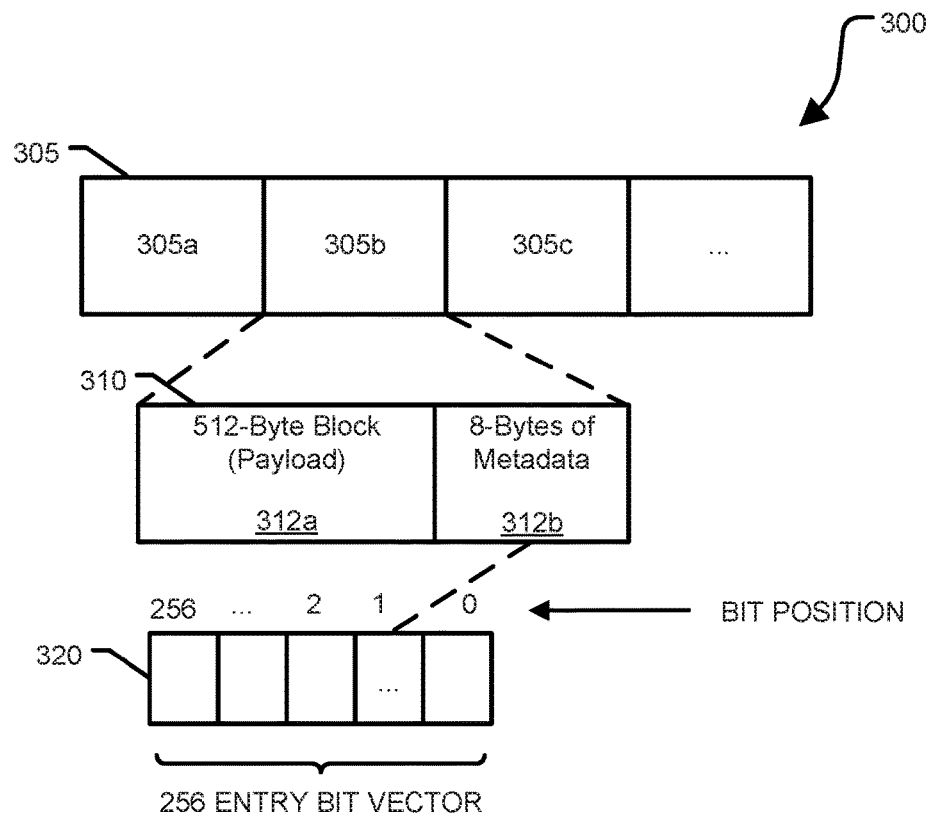
FIG. 3A is an example of input/output (I/O) data and associated data structures that may be used according to at least one embodiment of the present disclosure.

FIG. 3A is an example 300 of an I/O data 305 (for example, write data) and associated data structures that may be used according to at least one embodiment of the present disclosure. Other embodiments of I/O data and associated data structures, for example variations of the example 300, are possible and are intended to fall within the scope of the present disclosure. Generally, the I/O data or I/O payload (for example, write data or write payload) of an I/O operation (for example, write operation) specified in an I/O request (for example, write request) specified by a host may be divided (such as partitioned) into one or more data chunks or blocks. Data blocks (such as data chunks) are referred to herein as "blocks." In some embodiments, the size of each highest-level block may be the same size, such as 512 bytes of I/O data or payload. Additionally, associated with each block of I/O data may be metadata used to generally describe that particular block. Such metadata may include, for example, correction or error code information used in connection with validating the particular highest-level block such as in connection with validating and verifying the integrity of the block (for example, that the block was successfully transferred without corruption or modification from a local data storage system to a remote data storage system.

The example 300 illustrates I/O data 305 of a host-requested I/O operation that has been divided into 512-byte blocks, each associated with its own 8 bytes of metadata. In the example 300, data block 305a denotes a first block and its associated block-level metadata, data block 305b denotes a second block and its associated block-level metadata, and data block 305c denotes a third block and its associated block-level metadata. Generally, the I/O data is divided into a suitable number of blocks with associated per-block block-level metadata in accordance with the amount or size of the I/O data (for example, size of the I/O data or data payload). Thus, the I/O data 305 may collectively represent the result after dividing a single host I/O operation into multiple 512-byte blocks and additionally creating and associated per-block metadata with each such block.

Data block 310 illustrates the data block 305b in more detail although each other data block of the I/O data block 305 may be similar to that as illustrated by the data block 310. The data block 310 includes portions 312a and 312b. The portion 312a includes a 512-byte block or payload. The portion 312b includes 8-bytes of metadata 310b associated with portion 312a. Generally, particular sizes are used herein for purposes of illustration. However, such techniques herein may be used in connection with any suitable sizes and are not limited by those provided herein for illustration.

In some embodiments, the maximum data or payload size of any host I/O may be a single track of 128 KB. In such an embodiment, the maximum number of 512-byte blocks of a single I/O operation (maximum number of I/O blocks or payload) is 256. Thus, an embodiment may allocate suitable buffers, other memory, and structures for use with techniques herein to accommodate the maximum number of 256 portions (for example, 256 512-byte blocks and associated metadata).

Example 300 also illustrates metadata header 320 for use with techniques herein. The metadata header 320 may include information for a single host I/O operation. Other embodiments of a metadata header, for example, variations of the metadata header 320, are possible and are intended to fall within the scope of the present disclosure. For example, the metadata header 320, or portions thereof, may be implemented as an array data structure that comprises an array of bit positions.

Typically, metadata headers may include one bit for each block of data in the I/O data. For example, in some embodiments of the present disclosure, the I/O data may be of size 128 KB and the block size may be predefined to be 512 blocks. In such embodiments, the metadata header may be configured to have (128*1024)/512=256 bits. During deduplication, a bit representing a given block of I/O data may be set to 1 if deduplication is performed on the first level deduplication or the second level of deduplication, and may be set to 0 if there are no blocks in the I/O data corresponding to the position of the metadata header bit. Alternatively, all bits may be set to default to 0. The bit may also be at 0 if no deduplication is performed on the first level of deduplication or on the second level of deduplication. The metadata header also includes one bit for each block that is less than the number of blocks in the I/O data. For example, in some embodiments in which the maximum I/O data size is 128 KB and the block size is predefined to be 512 blocks, if the I/O data received from a host is only 10 KB in size, then only the least significant 20 bits of the metadata header may represent actual blocks of the I/O data, and the remaining 236 bits may be set to 0.

In this example, the metadata header 320 may be a bit vector or an array that is allocated 32 bytes (256 bits) of header information. The metadata header 320 includes a unique bit position for each of the possible 256 blocks for a single I/O operation. The bit positions are numbered 1 through 256, inclusively, as denoted in connection with the metadata header 320. In this illustration, the bit positions are from left to right (as depicted by an arrow). In another embodiment, the bit positions may be from right to left.

The process described in the following paragraphs may be performed to populate the metadata header 320. Each of the 512-byte blocks of the single host I/O operation is associated with a different corresponding one of the bit positions. Collectively, the I/O data 305 denotes the sequence or consecutive positions of the blocks in the host I/O operation. Thus, for example, data block 305a includes the first 512-byte block of the I/O data, data block 305b includes the second 512-byte block of the I/O data, data block 305c includes the third 512-byte block of the I/O data, and so on, for subsequent blocks of the single host I/O operation. The first 512-byte block of 305a has a corresponding bit position 0 in the metadata header 320. The second 512-byte block of 305b has a corresponding bit position 1 in the metadata header 320. The third 512-byte block of 305c has a corresponding bit position 2 in the metadata header 320. Similarly, each subsequent data block of the I/O data block 305 also has a corresponding bit position in metadata header 320. Based on the foregoing, there is a defined ordering or position of the 512-byte blocks in the I/O data payload where such ordering or position of each of the blocks has a corresponding unique position in the metadata header 320.

The metadata header 320 may be populated for use according to embodiments herein as follows:
- 0 if the final representation of the host I/O data to be transmitted from the data storage system 210 to the data storage system 260 is the first unique instance of the I/O data; or
- 1 if the final representation of the host I/O data to be transmitted from the data storage system 210 to the data storage system 260 includes a reference to a first unique instance of the I/O data.

Figure 3B:
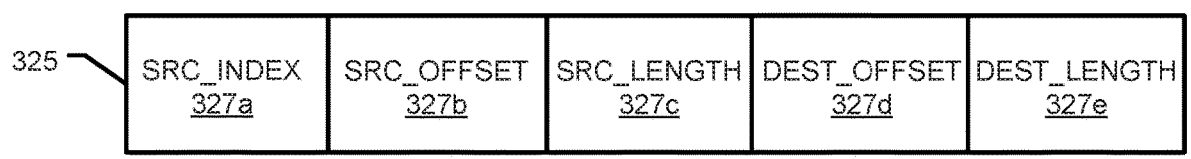
FIG. 3B is an example of a deduplication header according to at least one embodiment of the present disclosure.

FIG. 3B is an example of a deduplication header 325 according to at least one embodiment of the disclosure. Other embodiments of a deduplication header, for example variations of the deduplication header 325, are possible and are intended to fall within the scope of the present disclosure. For example the deduplication header 325, or portions thereof, may be implemented as an array data structure that comprises an array of deduplication reference fields, or "fields."

The deduplication header 325 may include a plurality of fields 327a to 327e. The plurality of fields may include a deduplication reference field, or "field," but not necessarily limited to a field that corresponds to a value of a source index, source offset, a source length, a destination offset, and a destination length. For example, the field 327a corresponds to the source index (SRC_INDEX), the field 327b corresponds to the source offset (SRC_OFFSET), the field 327c corresponds to the source length (SRC_LENGTH), field 327d corresponds to the destination offset (DEST_OFFSET), and field 327e corresponds to the destination length (DEST_LENGTH). The source index may reference a position of the first occurrence of a unique data block. The unique data block includes a unique payload. For example, if the first data block includes the first occurrence of the unique data block, the value of the source index is 0 (zero). The field 327a is updated with the value of the source index. The source offset may reference a position within the unique data block at which a duplicate or redundant data begins. The position may refer to the location of a byte that represents the duplicate or redundant data begins within the unique data block. For example, if the payload of the first block is identical to the payload of the second block, the value of the source offset is 0 because the duplicate value begins at the first position of the payload in the first block. The field 327b is updated with the value of the source offset. The source length may represent the length of the duplicate payload. For example, if the payload of the first block is identical to the payload of the second block, the value of the source length is 512 (such as the size of the data block). The field 327c is updated with the value of the source length. The destination offset may reference a position in the second block (such as the duplicate block) in which the duplicate value begins. For example, if the payload of the first block is identical to the payload of the second block, the destination offset is 0 because the duplicate value begins at the first position of the payload in the second block. The value of the field 327d is updated with the value of the destination offset. The destination length may represent the length of the duplicate payload. For example, if the payload of the first block is identical to the payload of the second block, the value of the destination length is 512 (such as the size of the data block).

Figure 4:
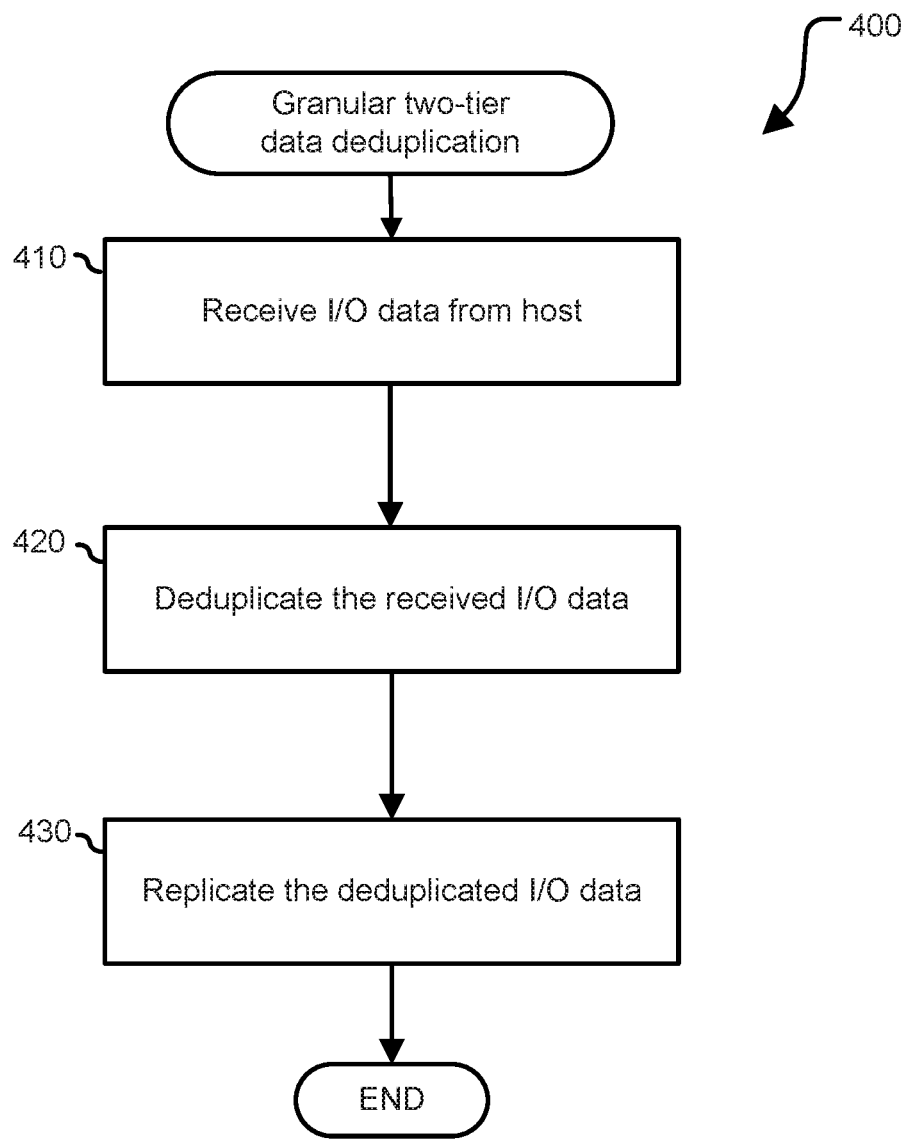
FIG. 4 is a flowchart illustrating an example of a method of performing aspects of data deduplication and replication according to at least one embodiment of the present disclosure.

FIG. 4 shows a method 400 of performing aspects of data deduplication and replication according to at least one embodiment of the present disclosure. Other embodiments of the method of performing aspects of data replication, for example variations of the method 400, are possible and are intended to fall within the scope of the disclosure. Each step of method 400 or portions thereof may be performed by one or more suitable components of the systems described above in relation to FIGS. 1-2.

In block 410, I/O data may be received, for example, at a first storage system from a host. For example, the I/O data may be received as part of an I/O data request from the host. In block 420, the I/O data may deduplicated and compressed, for example, as described in more detail below in relation to a method 500 described in FIG. 5. The steps of deduplicating and compressing may be referred to herein a performing data reduction or reduction on the I/O data, or data-reducing or reducing the I/O data. In some embodiments, data reduction techniques described herein are performed on host I/O operations having data to be transferred from the data storage system 210 to the data storage system 260 as part of a replication process performed by the RDF. The replication process performed by the data storage system 210 includes deduplicating identical and redundant blocks to unique instances of blocks and references to the unique blocks. The replication process may be performed in connection with egress or outbound processing of I/O data transmitted from the data storage system 210 to the data storage system 260. Data deduplication is known in the art and generally refers to removing redundant or duplicate data whereby only a single instance of the block is retained with pointers or references used in connection with duplicate or redundant copies (which reference or identify the single instance of the block). Data compression is known in the art and generally refers to data modification or conversion in such a way that the data consumes less space on a disk. For the purposes of this disclosure, reduced data is data that has been deduplicated and compressed.

In block 430, the reduced data may be transmitted to a remote data storage system. In some embodiments, a metadata header generated during the deduplication performed in the block 720 may be transmitted along with the reduced I/O data. The reduced data and the metadata header may be transmitted as part of a CDI header. In turn, the data storage system 260 receiving the deduplicated host I/O operation also performs processing to unwrap or restore the deduplicated data to its original block form on the ingress/inbound processing.

Figure 5:
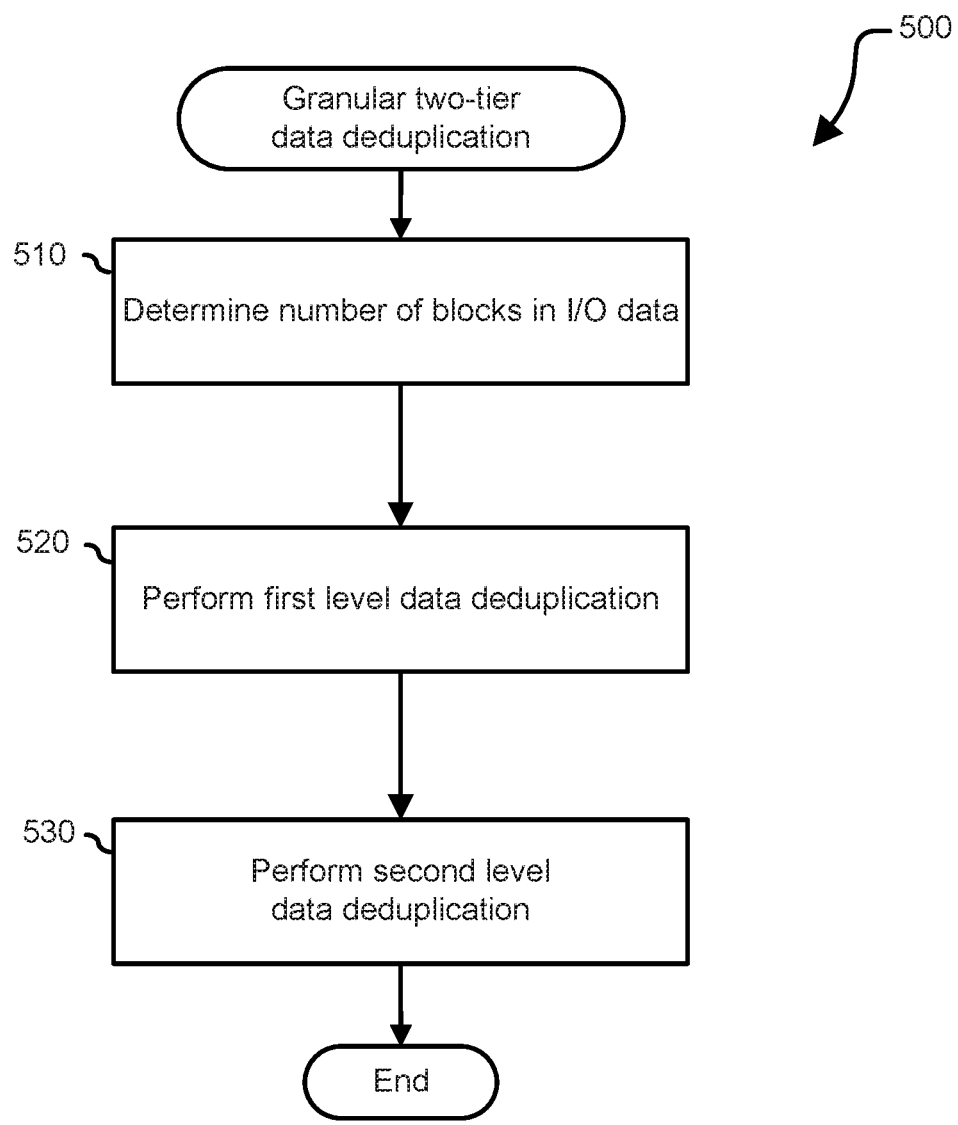
FIG. 5 is a flowchart illustrating an example of a method of performing multi-level deduplication according to at least one embodiment of the present disclosure.

FIG. 5 shows a method 500 of performing multi-level deduplication according to at least one embodiment of the present disclosure. In particular, method 500 is a detailed illustration of block 420 of FIG. 4. The multi-level deduplication uses a first level deduplication and a second level deduplication. Other embodiments of a method of performing multi-level deduplication, for example variations of the method 500, are possible and are intended to fall within the scope of the present disclosure. Each step of method 500 or portions thereof may be performed by one or more suitable components of the systems described above in relation to FIGS. 1-2.

At block 510, the number of blocks in the I/O data may be determined. This may be determined, for example, by dividing the I/O data size by a predefined block size (for example, 512, 1024, or any size as may be defined by an administrator or determined dynamically by the data storage system). In this example, the I/O data is divided into 512-byte data chunks. Dividing the I/O data into 512-byte data chunks is chosen because typically a CRC is assigned every 512-byte data chunk. The CRC is a 16-bit error-detecting code typically used to detect changes in raw data. The number of 512-byte data chunks may be determined using the following calculation:

$$\text{Number of 512 data blocks } (N) = \text{Data Size}/512$$

At block 520, the I/O data is processed at the first level deduplication or tier-1. At tier-1, deduplication is performed on identical data blocks by replacing every identical 512-byte data block with a unique first occurrence of the 512-byte data block. Various mechanisms may be performed to determine identical data blocks such as determining whether the current data block is a duplicate of a previous data block. On subsequent passes through the block 520, the data payload in the current data block may be compared to the data payload of each previous block, or each next block as determined by a defined order, in the I/O data, until the last block in the I/O data has been compared to all other blocks of the I/O data. Each data block with duplicate data payload is removed and replaced with a reference to the data block that has the first occurrence of the unique data payload. In addition, the metadata header associated with the block that includes the duplicate data payload is updated. A more detailed example of block 520 is described in block 605 of the FIG. 6.

At block 530, the I/O data is processed at the second level of deduplication or tier-2. At tier-2, deduplication is performed on similar data blocks. Various mechanisms may be performed to determine whether data blocks are similar, for example, by identifying the longest overlapping region with redundant data between two data blocks. The longest overlapping region may be determined by calculating a hamming distance between the two data blocks. For example, if a first data block and a second data block differ in 350, 510, and 511-byte position, the longest overlapping region is from a 0-byte position to the 350-byte position. The first 350 bytes of the second data block is then deduplicated. On subsequent passes through the block 530, the longest overlapping region may be determined for each block with another block until the longest overlapping region in the last block in the I/O data has been determined with all other blocks of the I/O data and deduplicated. Similar to block 520, deduplication includes updating a metadata header associated with a data block. Deduplication also includes replacing the data payload in the data block with a reference to the data block with the first occurrence of the longest overlapping data.

Figure 6:
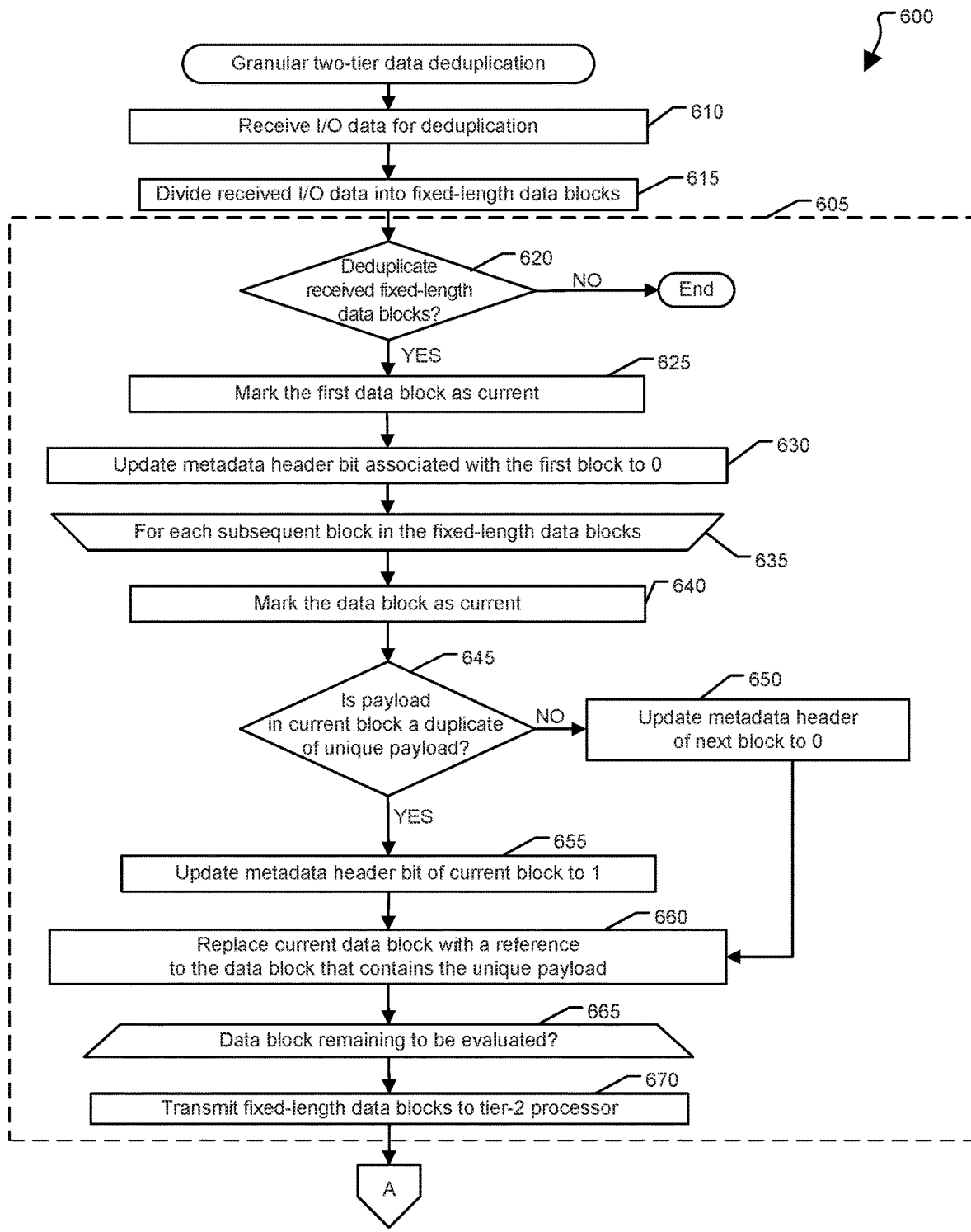
FIG. 6 is a flowchart illustrating an example of a method for performing multi-level deduplication according to at least one embodiment of the present disclosure.

FIG. 6 shows a method 600 performing multi-level deduplication according to at least one embodiment of the present disclosure. In particular, a block 605 of FIG. 6 is a more detailed illustration of the block 520 of FIG. 5. The method 600 may be performed by a data storage system (such as the data storage system 210) or in particular the tier-1 processor (such as the tier-1 processor 230) or any system that performs the functionality. Generally, I/O data of a host I/O operation may be received by the local or R1 data storage system. The I/O operation is an I/O operation directed to the R1 device of a configured R1-R2 device pairing such as illustrated in connection with FIG. 2 described elsewhere herein. Processing will be described below that may be performed on the local or R1 data storage system for the I/O data to be transmitted for replication on the corresponding R2 device of the remote or R2 data storage system. Additionally, processing will be described below that may be performed on the R2 or remote data storage system to apply the received I/O data to the R2 device.

Method 600 typically begins at block 610 where a data storage system receives I/O data from a host. The I/O data received may be part of an I/O data request from anyone host of a plurality of host systems. The I/O data request may be initiated by a backup software. For example, the backup software may be configured to perform daily, weekly, or monthly backups. The data storage system that receives the I/O data may be a local data storage system. The local data storage system may be associated with a particular group of data storage systems such as an RDF group. The I/O data request may be received through various means such as via hypertext transfer protocol (HTTP), simple object access protocol (SOAP), representational state transfer (REST), application program interface (API), etc.

After receiving the I/O data, the data storage system divides the received I/O data into fixed-length data blocks at block 615. After dividing the received I/O data, the divided I/O data is processed at the block 605 which includes blocks 620-670. For example, the received I/O data may be divided into 512-byte or 1024-byte data block sizes. The size of the data blocks may be predefined by an algorithm in the data storage system or an administrator that manages the data storage system. The number of fixed-length data blocks is also determined. The number of fixed-length data blocks may be determined by dividing size of the I/O data by the size of the fixed block.

At block 620, the data storage system determines whether to deduplicate the fixed-length data blocks. The data storage system may determine whether to deduplicate the data blocks using at least one rule or criteria such as a number of data blocks or size of the received I/O data. For example, the data storage system may deduplicate I/O data that has two or more data blocks or exceeding a certain size (for example, greater than 1024 bytes). If it is determined that the data blocks are to be deduplicated, the process transitions to block 625, otherwise the process ends.

At block 625, the first data block is marked as a current block. It is also understood that data contained in the first data block is the first occurrence of a unique data. This information is used when updating deduplication header information of subsequent data blocks to point to the position of the data block that holds the unique instance of data.

At block 630, a value of the metadata header bit associated with the first block to 0 (zero) is updated. Updating the metadata header bit to 0 means that the data contained in the first block is the first occurrence of the unique data.

At block 635, evaluation of the data blocks subsequent to the first data block begins. For example, the tier-1 processor may traverse the data blocks as structured. The tier-1 processor may also rearrange the data blocks based on various factors. For example, the rearrangement may be based on the order of the CRC, order of an alternative identifying information, etc.

The description will refer to the data block being processed as the current data block as marked in block 640. At block 645, a determination on whether payload in the current block is a duplicate of the unique payload is performed. This may be determined, for example, by comparing a fingerprint of the data payload of the current block to the fingerprint of the data block with the unique data payload. A fingerprint of a block may be the result of any function on the block that is guaranteed, or nearly guaranteed (to an acceptable degree), to be unique from the result produced by performing the same function on any data that is not a duplicate, for example, a one-way encrypted hash or a CRC. For example, in some embodiments in which the block size is defined to be 512, a 16-bit CRC-generated value may be compared. The received I/O data may already include a fingerprint (for example, a 16-bit CRC value) for each block, and on the first level of deduplication, the fingerprint of the current block in the I/O data may be compared to the fingerprint or the first block of the I/O data. On subsequent passes through the block 635, the fingerprint of the next block in the I/O data may be compared to the fingerprint of other data block in the I/O data (for example, previous data block), until the last block in the I/O data has been compared to all other blocks of the I/O data and deduplicated. In other embodiments, the fingerprint is associated with a data payload of the data block so comparison of fingerprints is a comparison of the data payloads.

If it is determined that the current data payload is not a duplicate of the unique data payload, the process transitions to block 650. At block 650, a value of the metadata header bit associated with the current block to 0 is updated. In some embodiments, all fields of the metadata header associated may be initialized to 0. If the metadata header is initialized to 0, the process does not update the value of the metadata header bit associated with the current block.

If it is determined that the current data payload is a duplicate of the unique data payload, then the process transitions to block 655. At block 655, a value of the metadata header bit associated with the current block is updated to 1. Updating the metadata header bit to 1 means that the payload contained in the current block is a duplicate. In some embodiments, all fields of the metadata header associated may be initialized to 0 and each field updated to 1 if the corresponding data block is determined to be a duplicate of the unique data block.

At block 660, the current block is replaced with a reference to the data block that includes the first occurrence of the unique data payload. The block 655 may be performed concurrently, at least in part, or before the performance of the block 660. For example, a deduplication header associated with the current block is updated. The deduplication header then replaces the current data block.

At block 665, it is determined if there is another data block to be evaluated. If there is another data block to be evaluated, the process proceeds with processing the next data block. In other embodiments, the process proceeds with processing the previous data block or some other block according to a defined order. If there is no other data block to be evaluated, the deduplicated data is transmitted to a second level processor for data deduplication (tier-2).

Figure 7:
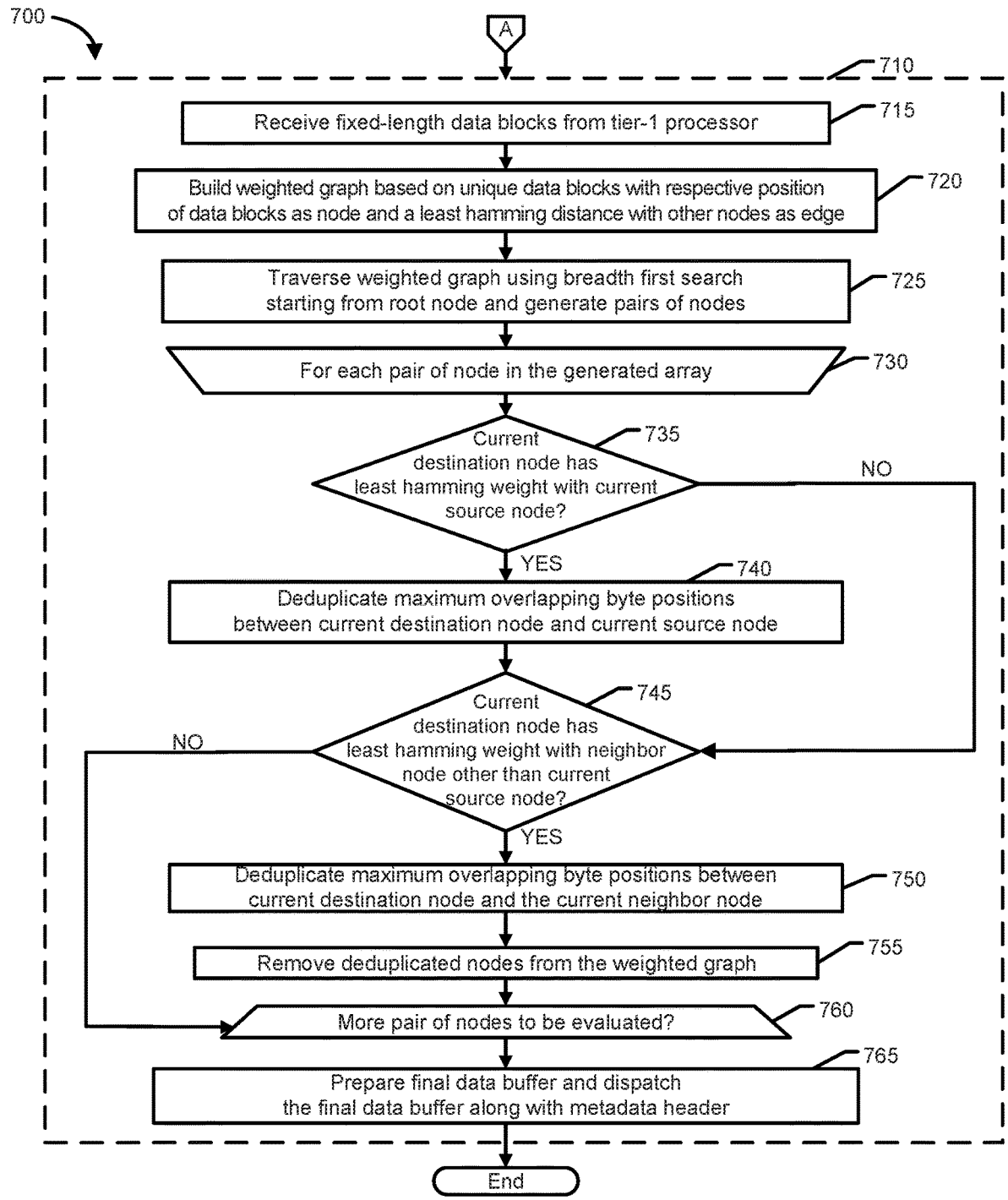
FIG. 7 is a flowchart illustrating an example of a method of performing a second level or tier-2 of a multi-level deduplication according to at least one embodiment of the present disclosure.

Operations of the method 600 of FIG. 6 continue at a transition point A, which continues at transition point A of method 700 of FIG. 7.

FIG. 7 shows the method 700 of performing a second level or tier-2 processor of a multi-level deduplication according to at least one embodiment of the present disclosure. The method 700 begins at block 710 where a data storage system receives data blocks from a tier-1 processor. The data blocks received may have been initially processed by a first level or tier-1 processor of a multi-level data deduplication data storage system. As explained above, tier-2 processor deduplicates similar data payload in a deduplicated data received from the tier-1 processor.

The block 710 as shown includes blocks 715-765. The block 710 is a detailed example of block 530 of FIG. 5. At the block 715, the tier-2 processor receives the transmitted deduplicated fixed-length data blocks from the first level processor. The received deduplicated fixed-length data blocks may be compressed.

At block 720, the received fixed-length data blocks are processed by building a weighted graph. The weighted graph is a collection of nodes that are connected to other nodes via edges. In this illustration, the nodes are the data blocks while the edges are the least Hamming distance between the data blocks. In building the weighted graph, data blocks may be inserted into the weighted graph using the position of the data blocks in the fixed-length data block structure. For example, the tier-2 processor may start using the first data block in the fixed-length data block structure as a first node in the weighted structure. The first node is marked as a source node. The next data block with the least hamming distance with the source node is inserted in the weighted graph. The next data block inserted is marked as a destination node. Each data block in the fixed-length data block is processed and inserted in the weighted graph until all the unique data blocks are added.

At block 725, once all the unique data blocks are added, the weighted graph is traversed using a breadth first search starting from a source node (for example, a root node) and explores each neighbor node or destination node (such as nodes that are connected to the root node) at a current layer prior to traversing nodes in the next layer. All nodes in the current layer are visited prior to visiting the next layer. The tier-2 processor may use a data structure such as an array to store the visited nodes. In addition, the tier-2 processor may use a flag to keep track of the visited nodes.

At block 725, the tier-2 processor begins to evaluate each pair of nodes in the weighted graph. The tier-2 processor may begin evaluating each pair of the nodes as stored in a structure. As each node is visited, the tier-2 processor may update the flag for example.

At block 730, the tier-2 processor determines, if the current destination node has the least hamming distance with the current source node which identifies that the current destination node and the current source node are similar. Similar nodes contain data payloads that are redundant. For example, if the data payload of the current source node is "VMAX" and the data payload of the current destination node is "VMXY", then the redundant data payload between the pair of nodes is "VM."

At block 735, if the tier-2 processor determines that the current source node and the current destination node are similar; both nodes are processed for data deduplication at block 740. If it is determined that the current source node and the current destination node are not similar then the process transitions to block 745. Data deduplication includes updating the bit in the metadata header associated with the data block that is associated with the current destination node to 1. In addition, the redundant data (such as the maximum overlapping area) between the current destination node and the current source node is replaced with a reference to the first unique occurrence of the redundant data. Assuming that the current source node includes the first unique occurrence of the redundant data, the data block in the current destination node is replaced with a reference to the redundant data in the current source node. The reference to the redundant data may be contained in a deduplication header. For example, a deduplication header associated with a data block that is associated with the current source node is updated. The deduplication header along with the non-redundant data replaces the data block. The non-redundant data comprises data with no overlaps between the current source node and the current destination node. A more detailed example of this process is described in FIG. 8.

At block 745, the tier-2 processor determines if the current destination node has a least hamming distance with a neighbor node at the same depth. If the current destination node and the neighbor node have the least Hamming distance, then the current destination node and the current neighbor nodes are similar. Similar nodes contain data payloads that are redundant. For example, if the data payload of the current destination node is "VMXY" and the payload of the current neighbor node is "DMXY", then the redundant data payload between the two nodes are "MXY."

At block 750, if the tier-2 processor determines that the current destination node and current neighbor node are similar; both nodes are processed for data deduplication. As explained above, data deduplication includes updating the bit in the metadata header associated with the data block associated with the current neighbor node to 1 and replacing the data block with a reference to the first unique occurrence of the redundant data.

At block 755, the tier-2 processor removes the deduplicated nodes from the weighted graph. The tier-2 processor may use various mechanisms when removing the deduplicated nodes from the weighted graph. For example, the tier-2 processor may update a flag to mark the removal of a deduplicated node.

At block 760, the tier-2 processor determines if there is another pair of the node to be evaluated. If there is another pair of nodes to be evaluated, the tier-2 processor proceeds with processing the next pair of nodes. Otherwise, the tier-2 processor transitions to block 765.

At the block 765, the final data buffer is prepared for storage and/or transmission. The final data buffer may be prepared by the tier-2 processor or a different component of the data storage system (not shown). The final data buffer may be transmitted along with the metadata header to another data storage system for storage and/or replication. The data payload in the buffer may be compressed prior to storage and/or transmission as part of the preparation. Information regarding the reduced data such as the size of the original I/O data may also be transmitted. Replication may be performed by another data storage system.

Figure 8:
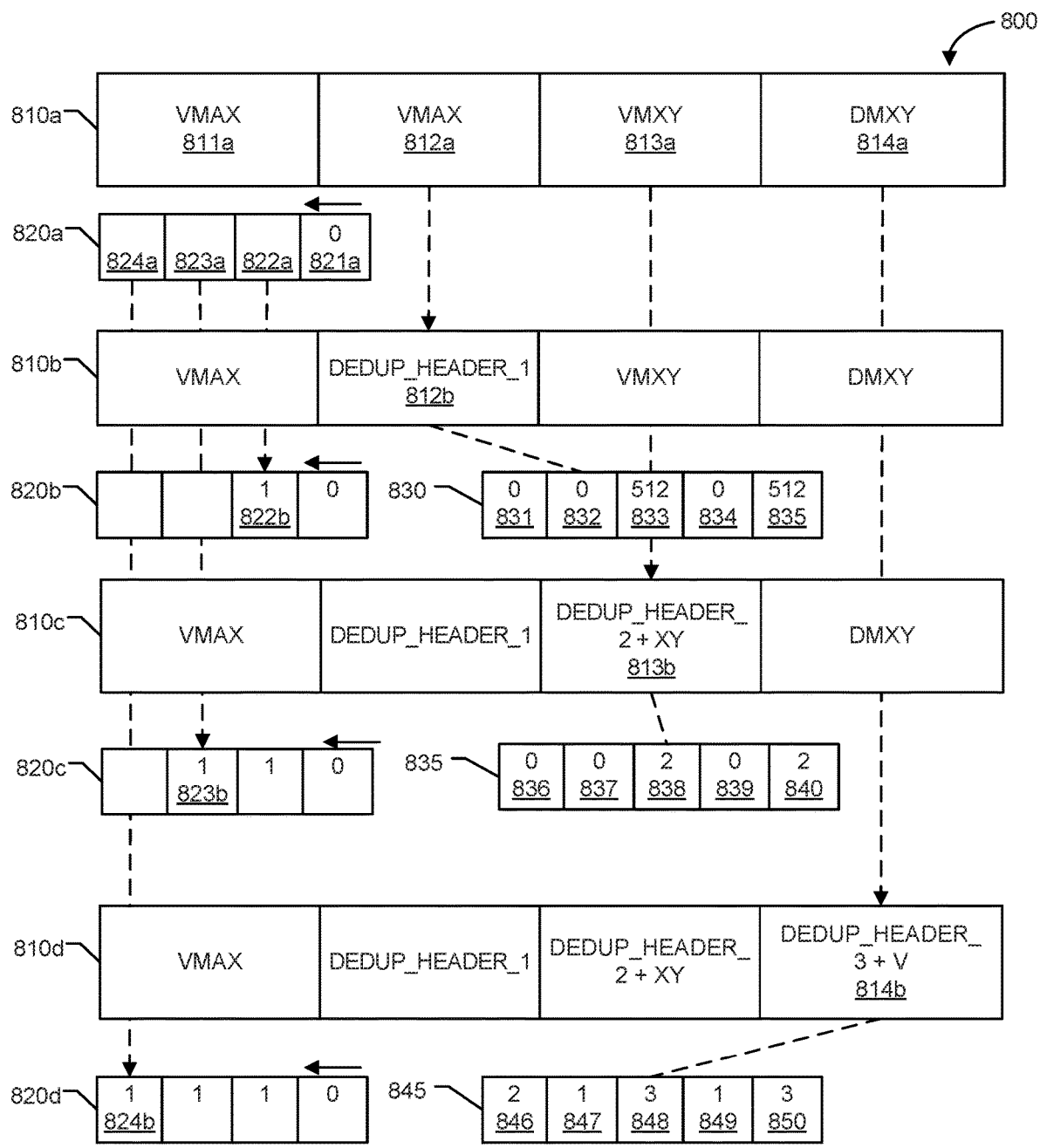
FIG. 8 illustrates an example of performing a multi-level deduplication according to at least one embodiment of the present disclosure.

FIG. 8 illustrates an example 800 of performing a multi-level deduplication according to at least one embodiment of the present disclosure. Other embodiments of an example of performing multi-level deduplication, for example variations of example 800, are possible and are intended to fall within the scope of the present disclosure. Each step of example 800 or portions thereof may be performed by one or more suitable components of the systems described above in relation to FIGS. 1 and 2.

In this example, an I/O data 810a represents I/O data to be written to the data storage system 12 as illustrated in FIGS. 1-2 and described elsewhere herein. As illustrated, the I/O data 810a represents received I/O data after execution of the block 410 of FIG. 4 or the block 610 of the FIG. 6. The I/O data 810a may be written in a data cache or buffer while being processed. In this example, the size of the I/O data 810a is 2 KB and the number of 512-byte blocks is four. Accordingly, the I/O data 810a is divided into four blocks 811a-814a.

Metadata header 820a includes information associated with I/O data 810a. As illustrated, metadata header 820b represents a metadata header after execution of the block 630. The metadata header 820a includes fields 821a-824a. Each field (for example, bit vector entry) corresponds to a 512-byte block in the I/O data 810a. For example, the field 821a corresponds to data block 811a, the field 822a corresponds to data block 812a, the field 823a corresponds to data block 813a, and the field 824a corresponds to data block 814a. As illustrated, the field 821a is updated to 0 (zero). Zero indicates that the payload contained in a corresponding data block of the field is unique and is not a duplicate of another data block in the I/O data. It should be appreciated that the data payload in the first data block in the I/O data is always unique in the sense the first block includes the first occurrence of a data payload. In another embodiment, the fields 821a-824a of the metadata header 820a are all initialized to 0.

I/O data 810b represents the I/O data 810a after the data block 812a has been deduplicated. As illustrated, field 822b represents the field 822a after an execution of the block 655 of the FIG. 6. During execution of the block 655, the data payload in the data block 812a is compared with the data payload in the data block 811a. As explained above, the comparison may be based on the comparison of fingerprints of the data blocks 811a and 812a. Because the data payload in the data block 812a is a duplicate of the data payload in the data block 811a, such as "VMAX"="VMAX," the field 822b (such as the field associated with the field 822a) is updated to 1 (one) as shown in the metadata header 820b. Updating the metadata header field to 1 indicates that the data payload of the corresponding field in the metadata header is a duplicate.

The data block 812a is replaced with a deduplication header (DEDUP_HEADER_1) as illustrated in the data block 812b after the update. The deduplication header includes information that references the first occurrence of the unique data (such as the data block 811a). A deduplication header 830 illustrates information contained in DEDUP_HEADER_1. The deduplication header 830 includes fields 831 to 835. The field 831 represents a source index with a value of 0 (such as the first data block) referencing the data block 811a which includes the first occurrence of the data payload in the data block 812a. The field 832 represents a source offset with a value of 0 since the data payload in the data block 811a is identical to the data payload in the data block 812a (such as the position of the first character "V" has an offset of 0 from the start of the payload "VMAX" in the data block 811a). The field 833 represents a source length with a value of 512 since the data payload in the data block 811a is identical to the data payload in the data block 812a (size of the data block 811a is 512 bytes). The field 834 represents the destination offset with a value of 0 since the data payload in the data block 811a is identical to the data payload in the data block 812a (the position of the first character "V" has an offset of 0 from the start of the data payload "VMAX" in the data block 812a). The field 835 represents a source length with a value of 512 since the data payload in the data block 811a is identical to the data payload in the data block 812a (size of the data block 811a is 512 bytes).

For simplicity purposes, several iterations of the blocks 635 to 665 of FIG. 6 is not shown as the payload in the next data blocks 813a and 814a are not identical duplicates of any other payload contained in other blocks of in the I/O 410a. As such the I/O data 810b represents the final I/O data block after execution of the block 665. The I/O data 810b is transmitted to a tier-2 processor for deduplication of similar data blocks. FIG. 7 illustrates methods that are executed by the tier-2 processor.

Figure 9:
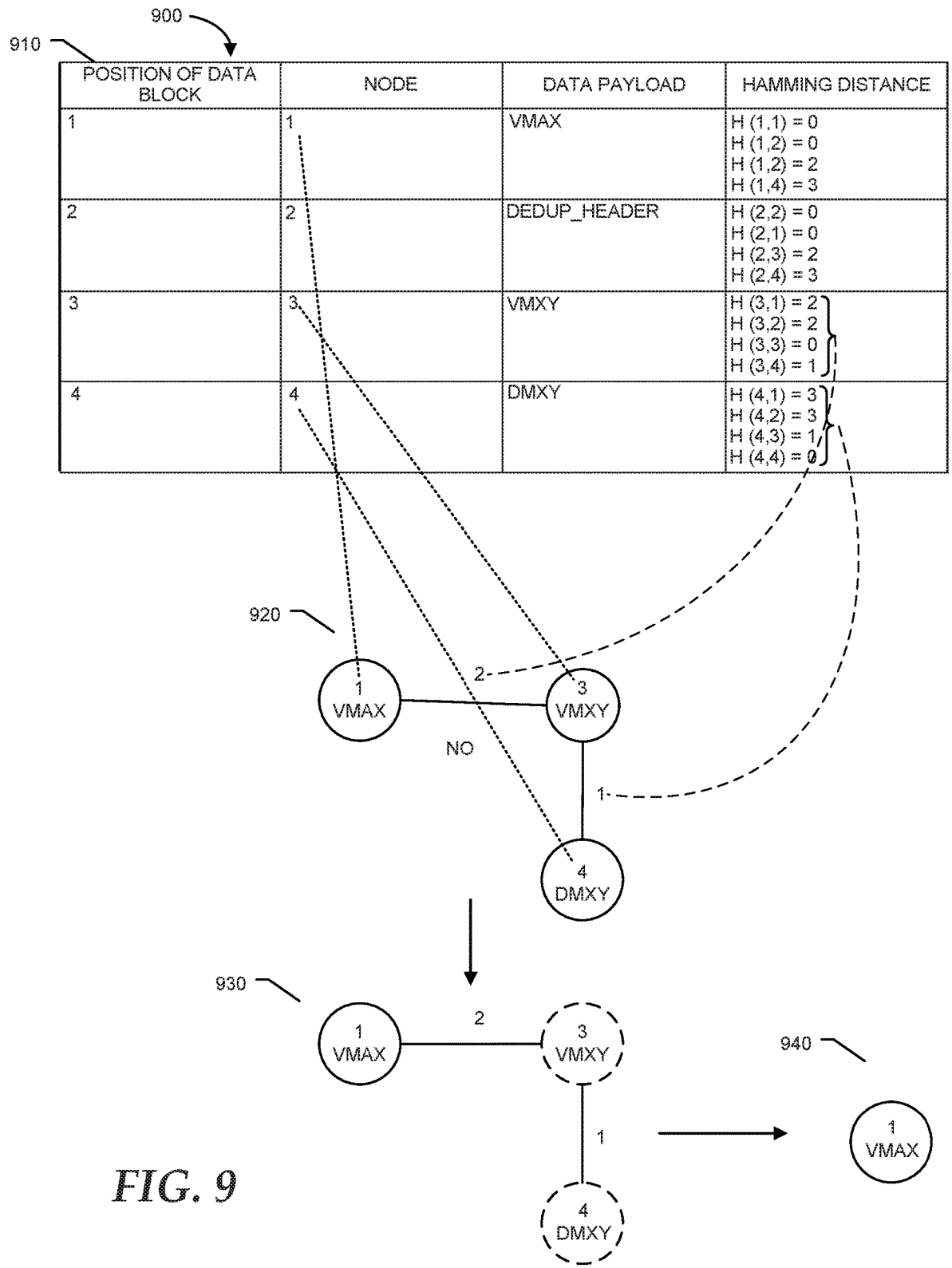
FIG. 9 is an example of a construction of a weighted graph by a tier-2 processor (such as a second level processor) used for further processing deduplicated I/O data and associated metadata received from a tier-1 processor (such as a first level processor) according to at least one embodiment of the present disclosure.

The I/O data 810c represents the I/O data 810b after the data block 813a has been deduplicated. As illustrated, the field 823b represents the field 823a after and execution of block 710 of FIG. 7. Another example of the execution of the block 710 in reference to the FIG. 8 is shown in FIG. 9. During execution of the block 710, the data payload in the data block 813a is compared with data payload in the data block 811a. At this instance of the example, the source node is the data block 811a and the destination node is the data block 813a. Because the data payload in the data block 813a is similar to the data payload in the data block 811a, ("VMXY" "VMAX"), the field 483a (the field associated with the data block 813a) is updated to 1 (one) as shown in the field 823b. As illustrated, the metadata header 820c shows the metadata header 820b after the update. The value of 1 of the field 823b indicates that the corresponding data block of the field 823b (the data block 813a) includes a redundant data payload.

The data block 813a is replaced with a deduplication header (DEDUP_HEADER_2) and the data payload in 813a that is unique, as illustrated in the data block 813b. For example, the data payload of the data block 813a (VMXY) is compared with the data payload of the data block 811a (VMAX). Since the data payload of the data blocks 813a and 811a are similar, including redundant data payload VM," the deduplication header DEDUP_HEADER_2 for the redundant data payload is updated. The deduplication header DEDUP_HEADER_2 includes information that references the first occurrence of the redundant data payload (the data block 811a). A deduplication header 835 illustrates information included in the deduplication header DEDUP_HEADER_2. The deduplication header 835 includes fields 836 to 840. The field 836 represents a source index with a value of 0 referencing the data block 811a (such as the first data block) which includes the first occurrence of the redundant data payload in data block 813a. The field 837 represents a source offset with a value of 0 since the redundant data payload in 813a has an offset of 0 from the start of the payload in 811a (such as the position of the first character "V" has an offset of 0 from the start of the payload "VMAX" in the data block 811a). The field 838 represents a source length with a value of 2 since the redundant data payload in 811a has a size of 2 (such as VM). The field 839 represents the destination offset with a value of 0 since the payload in 811a has an offset of 0 from the start of the redundant data payload in 813a (such as the position of the first character "V" has an offset of 0 from the start of the payload "VMXY" in the data block 813a). The field 840 represents a destination length with a value of 2 since the redundant data payload in 813a is 2 bytes ("VM" has 2 characters). For simplicity, this example assumes that 1 character is equivalent to 1 byte. However, the number of bytes may depend on various factors such as the type of data and the character encoding used for example.

I/O data 810d represents the I/O data 810c after the data block 814a has been deduplicated. As illustrated, field 824b represents field 824a after an update during execution of the block 710 of FIG. 7. During execution of the block 710, the data payload in the data block 813a (such as a destination node) is compared with the data payload in the data block 814a (such as a neighbor node). Because the payload in the data block 813a is similar to the data payload in the data block 814a, ("VMXY" "DMXY"), the field 824a (such as the field associated with the data block 814a is updated to 1 (one)) as shown in the field 824b. As illustrated, the metadata header 820d shows the metadata header 820c after the update. The value of 1 of the field 824b indicates the corresponding data block of field 824b (such as the data block 814a) includes a data payload that is not unique.

The data block 814a is replaced with a deduplication header (DEDUP_HEADER_3) and the value of a portion of the data payload in 814a that is not unique, as illustrated in the data block 814b. For example, the data payload of the data block 813a (VMXY) is compared with the data payload of the data block 814a (DMXY). Since the payload of the data blocks 813a and 814a are similar, including redundant data payload MXY, a deduplication header DEDUP_HEADER_3 for the redundant data payload is updated. The deduplication header DEDUP_HEADER_3 includes information that references a first occurrence of the redundant data payload (the data block 813a). A deduplication header 845 illustrates information included in deduplication header DEDUP_HEADER_3. The deduplication header 845 includes fields 846 to 850. The field 846 represents a source index with a value of 2 referencing the data block 813a (the data block at position index 2) which includes the first occurrence of the redundant data payload in the data block 814a. The field 847 represents a source offset with a value of 1 since the redundant data payload in the data block 813a has an offset of 1 from the start of the data payload in the data block 813a (the position of the first character "M" has an offset of 1 from the start of the data payload VMXY in the data block 813a). The field 848 represents a source length with a value of 3 since the redundant data payload in the data block 813a has a size of 3 (MXY). The field 849 represents the destination offset with a value of 1 since the data payload in the data block 814a has an offset of 1 from the start of the redundant data payload in the data block 814a (the position of the first character "M" has an offset of 1 from the start of the data payload DMXY in the data block 814a). The field 850 represents a destination length with a value of 3 since the redundant data payload in the data block 814a is 3 bytes (MXY has 3 characters).

FIG. 9 is an example of a construction of a weighted graph by the tier-2 processor used for further processing deduplicated data and associated metadata received from the tier-1 processor. The associated metadata received from the tier-1 processor includes a metadata header. A weighted graph is a graphical representation of all data blocks for deduplication of similar data. Each node in the graph represents a data block. Each edge represents a least Hamming distance between the data blocks. FIG. 9 is an illustration of a particular example in accordance with deduplication techniques as described in the block 710 of the FIG. 7.

Table 910 illustrates calculations performed during the construction of the weighted graph. For example, for each data block, the tier-2 processor determines the position of the data block and the Hamming distances with the other data block. In constructing the weighted graph, the tier-2 processor inserts or adds each data block as a node to the weighted graph according to its respective position and the least Hamming distance to the next node as an edge. For example in a weighted graph 920, the first data block is inserted as a first node or a root node. The tier-2 processor then determines whether to insert the second data block. Because the least hamming distance between the first block and the second data block is 0 (the second data block has been deduplicated by the tier-1 processor) the second data block is not inserted into the weighted graph. The tier-2 processor then determines whether to insert the third data block. Because the third data block was not deduplicated by the tier-1 processor, the third data block is inserted into the weighted graph. An edge with the least Hamming distance of 2 is used to connect the third data block to the first data block. The tier-2 processor then determines whether to insert the fourth data block into the weighted graph. Because the fourth data block was not deduplicated by the tier-1 processor, the fourth data block is inserted into the weighted graph. As illustrated in the table 910, the fourth data block has a hamming distance of 3 with the first data block, and a hamming distance of 1 with the third data block. Because 1 is the least hamming distance, an edge with a weight of 1 is inserted between the fourth data block and the third data block. The calculations and construction of the weighted graph 920 may be performed as part of the processing in the block 710 of the FIG. 7.

After all the data blocks (nodes) are added into the weighted graph, the tier-2 processor traverses the weighted graph 920 using a breadth-first search method generating pairs of nodes. The breadth-first search traversal explores the weighted graph 920 starting from the root node and traverses the root node's neighbor nodes at the present depth before moving to next depth. The tier-2 processor starts the breadth-first search traversal from the root node and determines the neighboring nodes of the root node. In this example, the third node is the only neighboring node of the first node.

The weighted graph 930 represents an instance during the breadth-first search traversal processing of the weighted graph 920. During breadth-first search traversal, the root node is designated as a current source node and the third node is designated as a current destination node. The tier-2 processor determines if the current destination node has an edge with a least hamming weight with that of the current source node, if so, then the current destination node and the current source node are processed for deduplication. In this example, because the current source node and the current destination node have a least hamming distance of 2 (VMAX and VMXY are different in 2 positions), the root node and the third node are deduplicated. This deduplication process of the third data block is illustrated in further detail in the FIG. 8. In particular, FIG. 8 includes the metadata header 820c and the deduplication header 835 generated for the third block during the deduplication.

The tier-2 processor determines if the current destination node has an edge with a least hamming distance with another node other than the current source node, if so, then the current destination node and the other node are processed for data deduplication. In this example, the current destination node is the third node. The third node also has an edge with a least hamming distance with the fourth node. Both the third node and the fourth node are processed for deduplication to replace the maximum overlapping area of the data payload between the data blocks. In this example, the current destination node has a hamming distance of 2 with the current source node (VMAX and VMXY are different in 2 positions). The current destination node also has a hamming distance of 1 with the other node which is the fourth node, (VMXY and DMXY are different in 1 position). Since the current destination node has similar data payload with the current source node, the data block of the current destination node is replaced with a reference to the current source node. Since the current other data block has similar data payload with the current destination node, the data block of the other node is replaced with a reference to the current destination node. Metadata header information for the each of the traversed nodes is updated, as shown in the metadata header 820*d* of FIG. 8. As shown in the weighted graph 930, the third and fourth nodes to show that both nodes have been deduplicated (illustrated with dashes). The tier-2 processor then removes the deduplicated nodes. The weighted graph 940 represents the weighted graph 920 after the deduplicated nodes have been removed.

Figure 10:
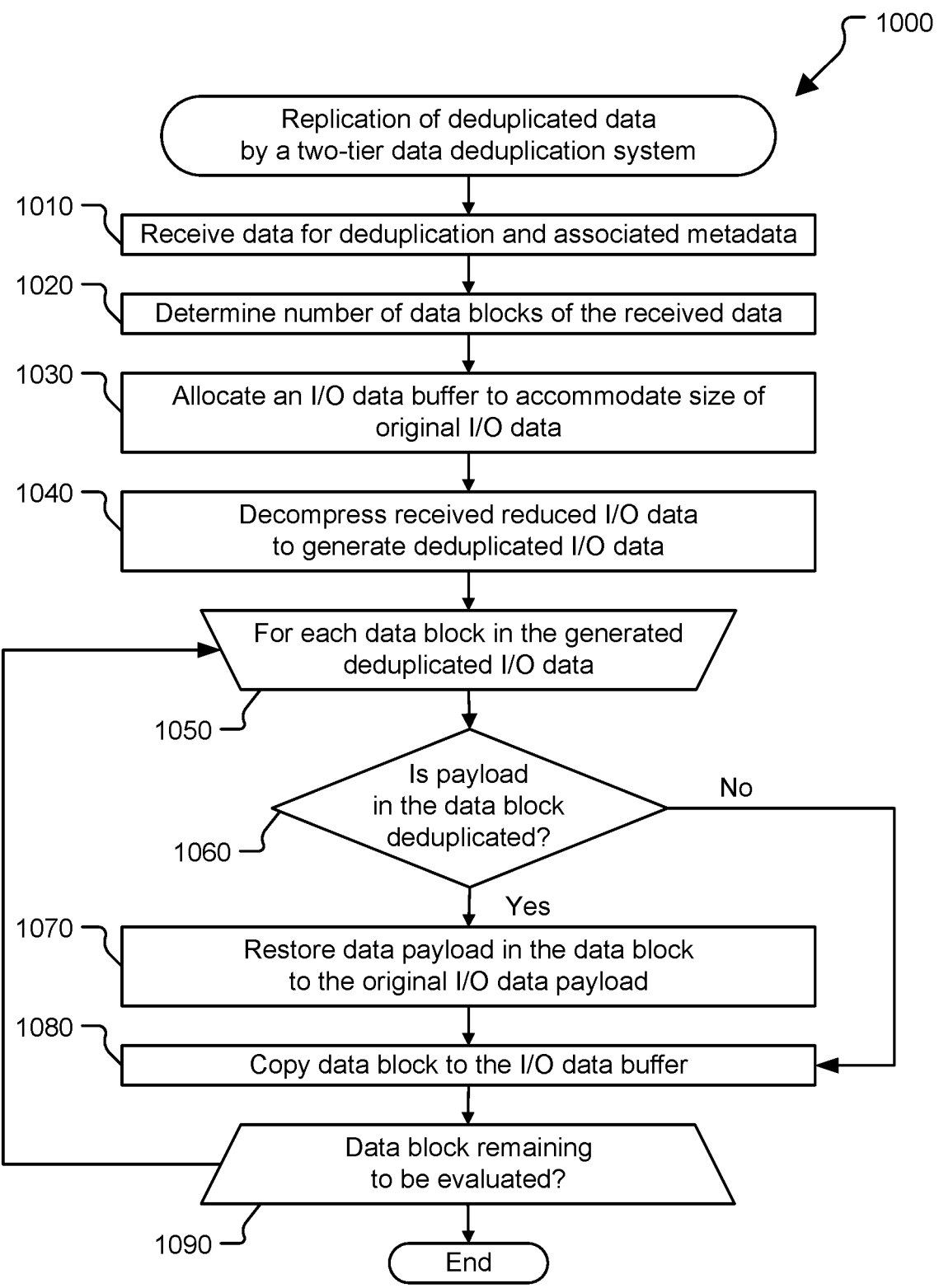
FIG. 10 is a flowchart illustrating an example of a method of restoring original I/O data from reduced I/O data according to at least one embodiment of the present disclosure.

FIG. 10 is a flowchart illustrating an example of a method 1000 for restoring the original I/O data from the reduced data according to at least one embodiment of the present disclosure. Other embodiments of the method 1000 of restoring to the original I/O data from the reduced I/O data, for example, variations of the method 1000, are possible and are intended to fall within the scope of the present disclosure. The method 1000 may be performed at a remote data storage system. The local and remote data storage systems may be implemented using a data storage system or components thereof described above in relation to the FIGS. 1-2.

In a block 1010, the reduced data and associated metadata may be received. The associated metadata may include CDI headers. The CDI headers include information regarding the reduced data such as an original I/O data size (data size of the original I/O data before deduplication), a reduced data size (data size of the I/O data after deduplication), a metadata header, and a deduplication header.

In a block 1020, a number of blocks of the original I/O data may be determined. The number of blocks may be determined from the data size of the original I/O data provided as part of the CDI header for example. The original size (for example, 2 KB) may be divided by a predefined block size (for example, 512) to determine the number of blocks of the original I/O data (for example, 4).

In a block 1030, an I/O data buffer of a size large enough to accommodate the original I/O data size (for example, 2 KB) may be allocated. The block 1020 may be performed concurrently, at least in part, or before the performance of the block 1030.

In a block 1040, the reduced data may be decompressed to generate a deduplicated I/O data, after which the original I/O data may be restored by the performance of blocks 1050-1090 on the deduplicated I/O data. In the block 1050, the deduplicated data is traversed to evaluate each data block of the deduplicated I/O data. The data block that is currently being evaluated is herein referred to as a current data block.

In block 1060, the current data block is evaluated to determine whether the data payload of the data block has been deduplicated. Determining whether the current data block has been deduplicated may include inspecting the field (for example, a bit) in the metadata header corresponding to the current data block. For example, a value of 1 in the field may indicate that the data payload of the current data block has been deduplicated, and a value of 0 may indicate that data payload of the current data block has not been deduplicated (that is unique). If it is determined that the data payload of the current data block has been deduplicated then processing proceeds to a block 1070. Otherwise, processing proceeds to a block 1080. In the block 1080, the data payload of the current data block is copied to the corresponding data block in the I/O data buffer. In some embodiments, data blocks with unique data payloads are arranged in some particular order before any data blocks with referenced data (for example, identical or redundant data payload).

In the block 1070, the data payload in the current data block is restored to the original I/O data payload. The data payload may be restored based on the deduplication header associated with the current data block. For example, the deduplication header may be parsed to determine the source index, the source offset, the source length, the destination offset, and the destination length of the deduplicated data payload.

At a block 1080, the current data block with the restored data payload is copied to the I/O data buffer. At a block 1090, if there is another data block remaining to be evaluated, the process proceeds with the next data block in the block 1050; otherwise, the process may end. After completion of the method 1000, the original I/O data is now restored in the I/O buffer.

Figure 11:
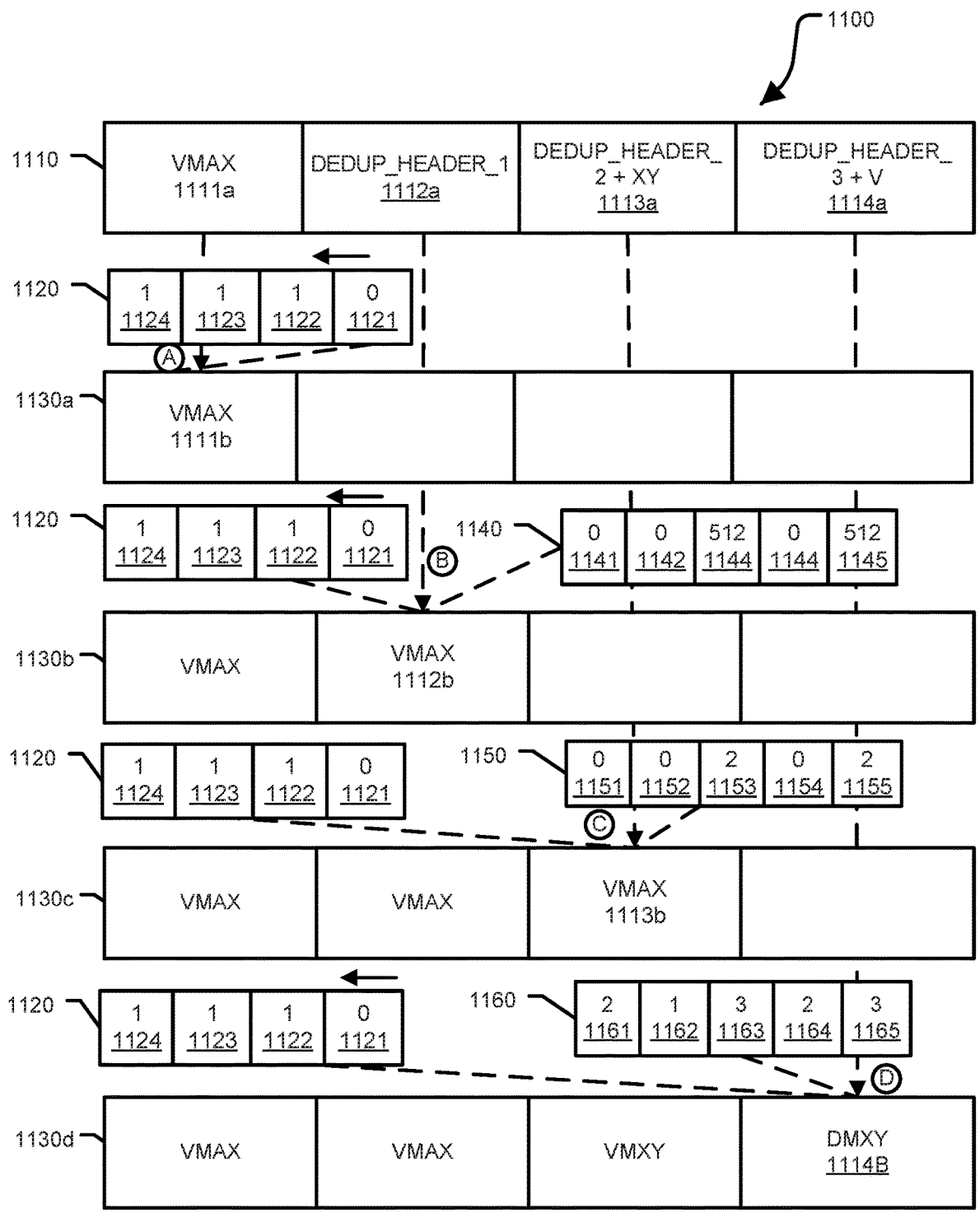
FIG. 11 is an example data replication performed by the method on deduplicated I/O data according to at least one embodiment of the present disclosure.

FIG. 11 is an example data replication performed by the method 1000 of the FIG. 10 on a deduplicated data 1110 to at least one embodiment of the present disclosure. The deduplicated data 1110 was generated after the received reduced data was decompressed in the second data storage system (for example, a remote data storage system) in block 1040 of the FIG. 10. The deduplicated data 1110 includes data blocks 1111*a*, 1112*a*, 1113*a*, and 1114*a*. A metadata header 1120 associated with the deduplicated data 1110 is shown. The metadata header 1120 includes fields 1121, 1122, 1123, and 1124. An arrow above the metadata header 1120 shows the direction in which fields 1121-1124 are read. Accordingly, the field 1121 is associated with the data block 1111*a*; the field 1122 is associated with the data block 1112*a*; the field 1123 is associated with the data block 1113*a*, and the field 1124 is associated with the data block 1114*a*.

FIG. 11 is annotated with a series of letters A-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Stage A is an example of the first iteration of the blocks 1050-1090 of the FIG. 10. At this stage, the data block 111*a* is evaluated to determine if the data block 111*a* was deduplicated. To determine whether a data block is deduplicated or not (that is unique), a metadata header field associated with the data block is inspected. For example, if the value of the field is 0, the data block is unique; if the value of the field is 1, the data block has been deduplicated. In this instance, the field 1121 has a value 0 which indicates that the data block 1111*a* is unique. The data block 111*a* is copied to an I/O data buffer 1130*a*.

Stage B is an example of a second iteration of the blocks 1050-1090 of the FIG. 10. At this stage, the data block 1112*a* is evaluated to determine if the data block 1112*a* has been deduplicated. In this instance, the field 1122 has a value of 1 which indicates that the data block 1112*a* has been deduplicated. The deduplication header DEDUP_HEADER_1 in the data block 1112*a* is parsed to restore the original data payload. A deduplication header 1140 represents the values in DEDUP_HEADER_1. In the block 1070 of FIG. 10, it may be determined that the deduplication header 1140 has a source index 1141 of 0, a source offset 1142 of 0, a source length 1143 of 512, a destination offset of 0, and a destination offset of 512. Since the value of the source index 1141 is 0, the source index 1141 is referencing a first data block (the data block 1111*a*). Since the value of the source offset 1142 is 0, and the source length 1143 is 512, the data block 1112*a* is identical to the referenced data block 1111*a*. The data block 1112 is then added to the I/O buffer 1130*a*. An I/O buffer 1130*b* shows the I/O data buffer 1130*a* after the data block 1112 has been added.

Stage C is an example of a third iteration of the blocks 1050-1090 of FIG. 10, the data block 1113*a* is evaluated to determine if the data block 1113*a* has been deduplicated. In this instance, the field 1123 has a value of 1 which indicates that the data block 1113*a* has been deduplicated. The deduplication header DEDUP_HEADER_2 in the data block 1113*a* is parsed to restore the original payload. A deduplication header 1150 represents the values in DEDUP_HEADER_2. During processing of the block 1070 of FIG. 10 it may be determined that the data deduplication header 1150 has a source index 1151 with a value of 0, a source offset 1152 with a value of 0, a source length 1153 with a value of 2, a destination offset 1154 with a value of 0, and a destination offset 1155 with a value of 2. The value of the source index 1151 is 0 which references the position a data block (the data block 1111*a*). The value 0 of the source offset 1152 is 0 which references the position of a first element of the redundant data (character V in VMAX). The value 2 of the source length 1153 indicates that the length of the redundant data payload is 2 positions (VM). The overlapping redundant data (VM) plus the nonredundant data payload (XY, as shown in the data block 1113*a*) is then added to the I/O buffer 1130*a* as shown in the I/O buffer 1130*c*.

Stage D is an example of a fourth iteration of the blocks 1050-1090 of the FIG. 10. At this stage, the data block 1114*a* is evaluated to determine if the data block 1114*a* has been deduplicated. The field 1124 is associated with the data block 1114*a*. In this instance, the field 1124 has a value of 1 which indicates that the data block 1114*a* has been deduplicated. The deduplication header DEDUP_HEADER_3 in the data block 1114*a* is parsed to restore the original data payload. A deduplication header 1160 represents the values in the deduplication header DEDUP_HEADER_3. During processing of the block 1070 of the FIG. 10 it may be determined that the deduplication header 1160 has a source index 1161 with a value of 2, a source offset 1162 with a value of 1, a source length 1163 with a value of 3. The value of the source index 1161 is 2, which references the position of the data block 1113*a*. The value of the source offset 1162 is 1, which references the position of the character M in VMXY of the data block 1113*a*. The value of the source length 1163 is 3, which identifies the length of the redundant portion of the data payload (MXY in the data block 1113*a* is equal to MXY in the data block 1114*a*). The overlapping redundant data payload MXY plus the unique data payload (V as shown in the data block 1114*a*) is then added to the I/O buffer 1130*c* as shown in the I/O buffer 1130*d*.

Figure 12:
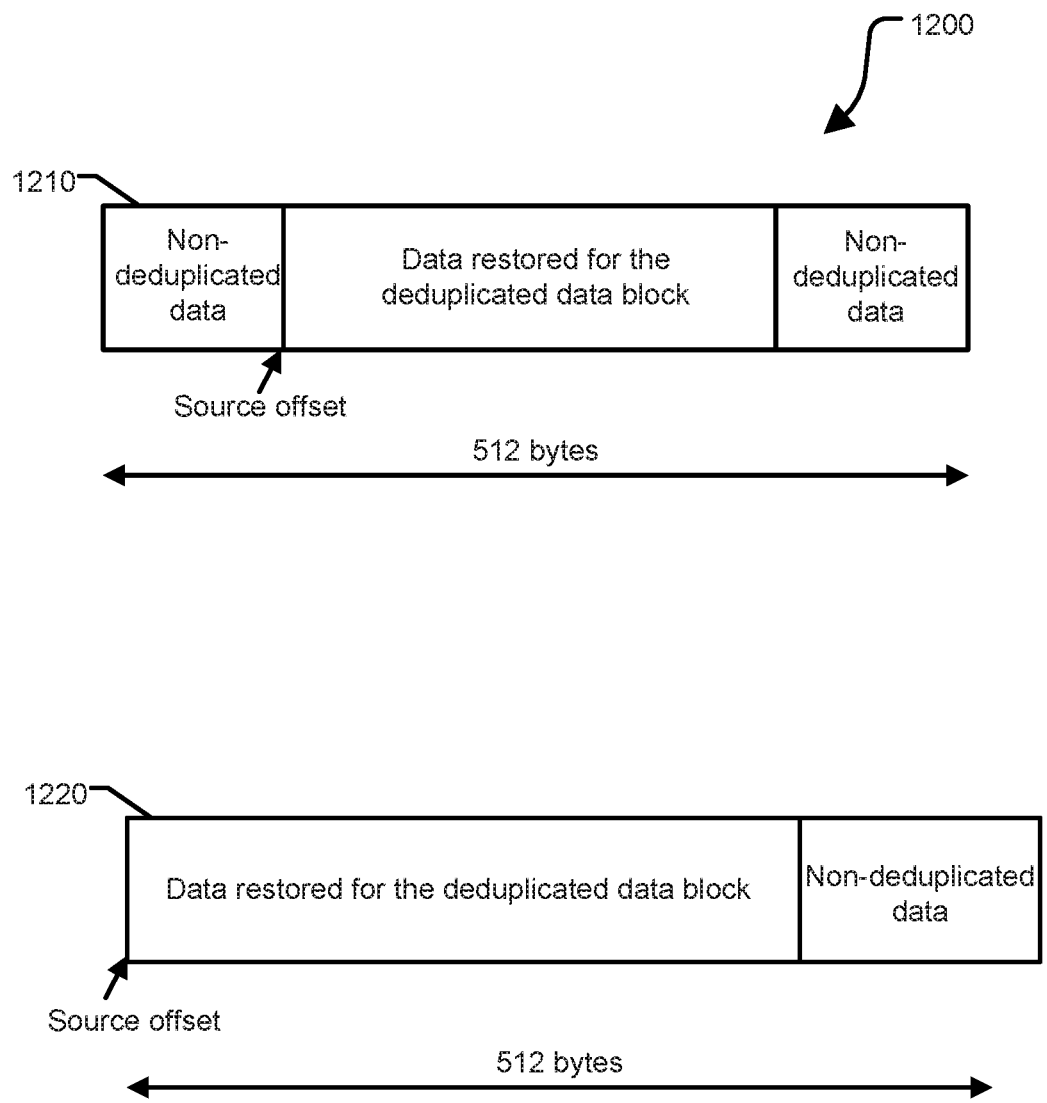
FIG. 12 shows an example of the process for restoring original data from received replication data according to at least one embodiment of the present disclosure.

FIG. 12 shows an example 1200 of the process for restoring original data from a received replication data according to at least one embodiment of the present disclosure. The replication data may be received from a primary data storage system for example. The restoration of the original data may be performed in the secondary data storage system. The original data is restored in the I/O buffer based on the metadata source offset and source length. If the source length is not equivalent to 512 bytes, the unique or non-deduplicated data is copied from the received replication data to a current 512-byte block in an allocated buffer. The length of the non-deduplicated data is equal to 512 bytes (such as the length of the defined block) less the source length. Allocated buffer 1210 shows the placement of the restored data when the source offset is greater than 0. Allocated buffer 1220 shows the placement of the restored data when the source offset is equal to 0.

The examples often refer to a tier-1 processor and a tier-2 processor. The tier-1 processor and the tier-2 processor are constructs used to refer to the implementation of functionality of performing first level and second data deduplication respectively. The first level data deduplication refers to deduplication of identical or duplicate data. The second level data deduplication refers to deduplication of similar data. However, first level data deduplication and second level deduplication may be performed by a single processor. For example, in FIG. 2, the deduplication system 225 includes a tier-1 processor 230 and a tier-2 processor 235. Although processing of I/O data is shown serially, processing of the I/O data may be performed in parallel. For example, while the tier-2 processor 235 is processing deduplicated I/O data received from the tier-1 processor, the tier-1 processor is processing another I/O data received from a host. In another example, the deduplication system 225 may include a deduplication processor that performs the functions of both the tier-1 processor 230 and the tier-2 processor 235.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel, parts of the operations may be performed, and the operations may be performed in a different order. For example, the operations depicted by the blocks 1020 and 1030 of the FIG. 10 can be performed in parallel. In another example, the operations depicted by the block 1040 may not be performed if the data received has not been compressed in another embodiment. It will be understood that each block of the flowchart illustrations and/or block diagrams and combinations of blocks in the flowchart illustrations and/or block diagrams can be implemented by program code. The program code may be provided to a processor of a general purpose computer, special purpose computer, or other programmable machine or apparatus.

Figure 13:
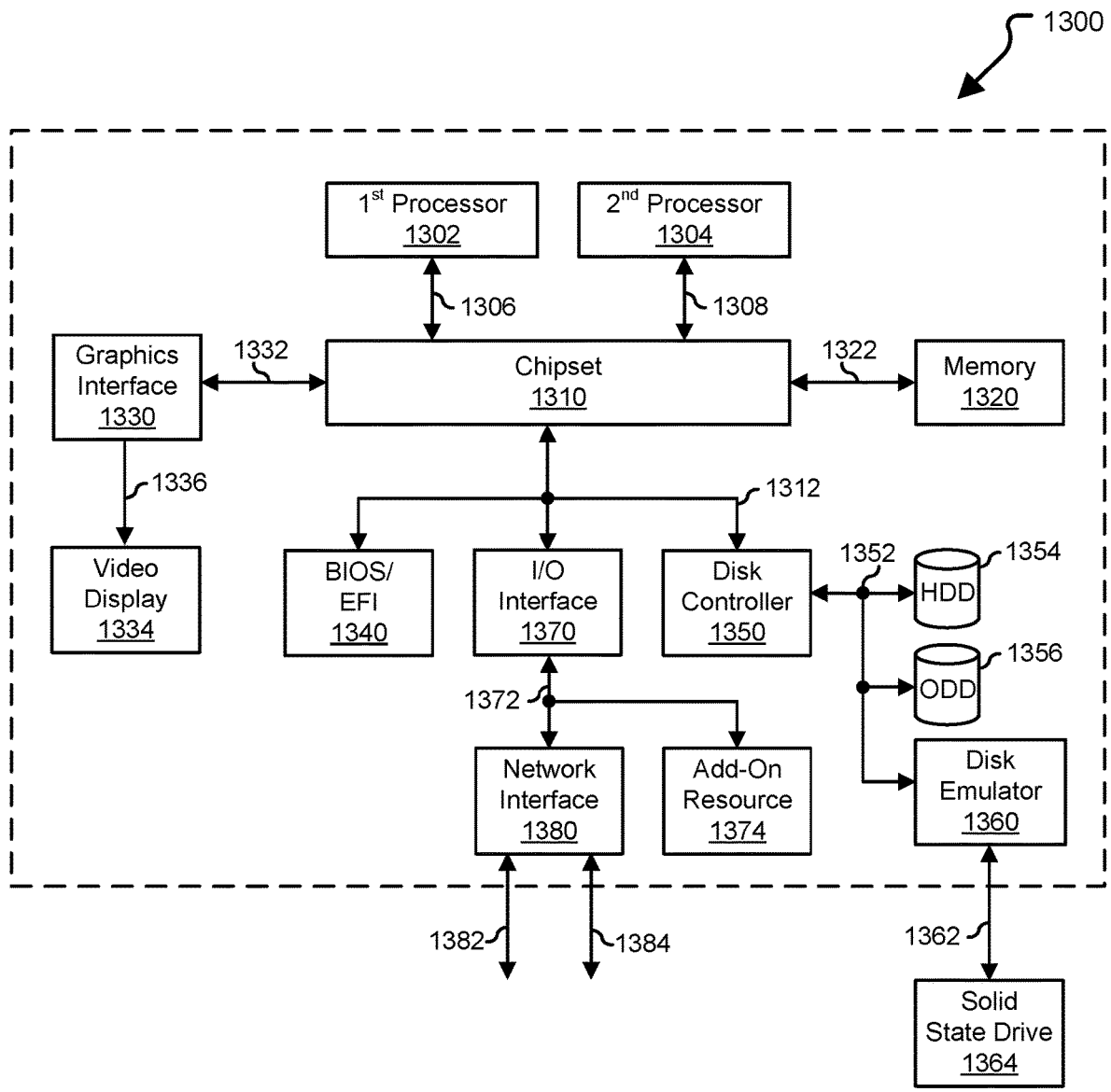
FIG. 13 is a block diagram illustrating an information handling system according to an embodiment of the present disclosure.

FIG. 13 illustrates a generalized embodiment of information handling system 1300. For purpose of this disclosure information handling system 1300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1300 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 1300 can include processing resources for executing machine-executable code, such as a central processing unit (CPU), a programmable logic array (PLA), an embedded device such as a System-on-a-Chip (SoC), or other control logic hardware. Information handling system 1300 can also include one or more computer-readable medium for storing machine-executable code, such as software or data. Additional components of information handling system 1300 can include one or more storage devices that can store machine-executable code, one or more communications ports for communicating with external devices, and various I/O devices, such as a keyboard, a mouse, and a video display. Information handling system 1300 can also include one or more buses operable to transmit information between the various hardware components.

Information handling system 1300 can include devices or modules that embody one or more of the devices or modules described above and operates to perform one or more of the methods described above. Information handling system 1300 includes a processors, 1302 and 1304, a chipset 1310, a memory 1320, a graphics interface 1330, include a basic input and output system/extensible firmware interface (BIOS/EFI) module 1340, a disk controller 1350, a disk emulator 1360, an I/O interface 1370, and a network interface 1380. Processor 1302 is connected to chipset 1310 via processor interface 1306, and processor 1304 is connected to chipset 1310 via processor interface 1308. Memory 1320 is connected to chipset 1310 via a memory bus 1322. Graphics interface 1330 is connected to chipset 1310 via a graphics interface 1332 and provides a video display output 1336 to a video display 1334. In a particular embodiment, information handling system 1300 includes separate memories that are dedicated to each of processors 1302 and 1304 via separate memory interfaces. An example of memory 1320 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 1340, disk controller 1350, and I/O interface 1370 are connected to chipset 1310 via an I/O channel 1312. An example of I/O channel 1312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1310 can also include one or more other I/O interfaces, including an Industry Standard Architecture (ISA) interface, an SCSI interface, an Inter-Integrated Circuit ($I^2C$) interface, a System Packet Interface (SPI), a Universal Serial Bus (USB), another interface, or a combination thereof. BIOS/EFI module 1340 includes BIOS/EFI code operable to detect resources within information handling system 1300, to provide drivers for the resources, initialize the resources, and access the resources. BIOS/EFI module 1340 includes code that operates to detect resources within information handling system 1300, to provide drivers for the resources, to initialize the resources, and to access the resources.

Disk controller 1350 includes a disk interface 1352 that connects the disc controller to a hard disk drive (HDD) 1354, to an optical disk drive (ODD) 1356, and to disk emulator 1360. An example of disk interface 1352 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 1360 permits a solid-state drive 1364 to be connected to information handling system 1300 via an external interface 1362. An example of external interface 1362 includes a universal serial bus (USB) interface, an Institute of Electrical and Electronics Engineers (IEEE) 1194 (Firewire) interface, a proprietary interface, or a combination thereof. Alternatively, solid-state drive 1364 can be disposed within information handling system 1300.

I/O interface 1370 includes a peripheral interface 1372 that connects the I/O interface to an add-on resource 1374 and to network interface 1380. Peripheral interface 1372 can be the same type of interface as I/O channel 1312 or can be a different type of interface. As such, I/O interface 1370 extends the capacity of I/O channel 1312 when peripheral interface 1372 and the I/O channel are of the same type, and the I/O interface translates information from a format suitable to the I/O channel to a format suitable to the peripheral interface 1372 when they are of a different type. Add-on resource 1374 can include a data storage system, an additional graphics interface, a network interface card (NIC), a sound/video processing card, another add-on resource, or a combination thereof. Add-on resource 1374 can be on a main circuit board, on separate circuit board or add-in card disposed within information handling system 1300, a device that is external to the information handling system, or a combination thereof.

Network interface 1380 represents a NIC disposed within information handling system 1300, on a main circuit board of the information handling system, integrated onto another component such as chipset 1310, in another suitable location, or a combination thereof. Network interface 1380 includes network channels 1382 and 1384 that provide interfaces to devices that are external to information handling system 1300. In a particular embodiment, network channels 1382 and 1384 are of a different type than peripheral interface 1372 and network interface 1380 translates information from a format suitable to the peripheral channel to a format suitable to external devices. An example of network channels 1382 and 1384 includes InfiniBand channels, Fibre Channel channels, Gigabit Ethernet channels, proprietary channel architectures, or a combination thereof. Network channels 1382 and 1384 can be connected to external network resources (not illustrated). The network resource can include another information handling system, a data storage system, another network, a grid management system, another suitable resource, or a combination thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method of improving a data storage system, the method comprising:
   dividing, by a hardware processor, input/output (I/O) data into a plurality of blocks;
   deduplicating the I/O data to produce deduplicated I/O data, wherein the deduplication includes determining whether a first block is a duplicate block of another one of the blocks, in response to determining that the first block is a duplicate block, replacing the duplicate block with a reference to the first block and updating a metadata header with a first value, and in response to determining that the first block is not a duplicate block of any one of the blocks, updating the metadata header with a second value;
   subsequent to the deduplicating the I/O data, determining whether the first block has a maximum overlapping area of redundant data with a particular one of the blocks that is not a duplicate block, wherein the determining that the first block has the maximum overlapping area of redundant data includes generating a weighted graph that includes a plurality of nodes and a plurality of weighted edges, each of the nodes representing a block of the blocks of the I/O data, each of the weighted edges connecting two of the nodes and being associated with a weight representing a Hamming distance between the two of the nodes, generating the weighted graph further includes adding a node with a least Hamming distance to a next node; and
   in response to determining that the first block has a maximum overlapping area of redundant data with the particular block, identifying non-overlapping data between the first block and the particular block and replacing the particular block with a reference to the first block and to the identified non-overlapping data.

2. The method of claim 1, further comprising:
   determining that at least a second block is a duplicate of a third block; and
   replacing the second block with a reference to the third block.

3. The method of claim 1, further comprising:
   replicating the I/O data to a second storage system, including transmitting the deduplicated I/O data to the second storage system.

4. The method of claim 1, further comprising:
   generating a first data structure including metadata information corresponding to the I/O data, the first data structure having a plurality of fields, each field representing a particular block of the blocks of the I/O data and indicating whether the particular block has been replaced with a reference to another block.

5. The method of claim 4, further comprising:
   generating a second data structure including deduplication information for the deduplicated I/O data, the second data structure having a plurality of fields that correspond to a value of a source index, a source offset, a source length, a destination offset, and a destination length.

6. The method of claim 5, further comprising:
   replicating the I/O data to a second storage system, including transmitting the deduplicated I/O data to the second storage system; and
   at the second storage system, restoring the I/O data from the deduplicated I/O data using the metadata information from the first data structure and the deduplication information from the second data structure.

7. The method of claim 6, further comprising:
   compressing the deduplicated I/O data prior to transmitting the deduplicated I/O data to the second storage system such that transmitting the deduplicated I/O data includes information regarding the deduplicated I/O data.

8. The method of claim 1, further comprising preparing a data buffer for storage.

9. The method of claim 1, wherein after generating the weighted graph, a breadth first search is performed on the weighted graph to determine the maximum overlapping area of duplicate data of the first block with the particular block.

10. A data storage system in which input/output (I/O) data includes a plurality of blocks, the data storage system comprising:
    one or more processors; and
    a memory having code stored thereon that, when executed, performs a method including:
       determining whether a first block is a duplicate block of another one of the blocks, and in response to determining that the first block is a duplicate block, replacing the duplicate block with a reference to the first block;
       subsequent to the determining whether the first block is a duplicate block of the another one of the blocks, determining whether the first block has a maximum overlapping area of duplicate data with a particular one of the blocks that is not a duplicate block, wherein the determining that the first block has the maximum overlapping area of duplicate data includes generating a weighted graph that includes a plurality of nodes and a plurality of weighted edges, each of the nodes representing a block of the blocks of the I/O data, each of the weighted edges connecting two of the nodes and being associated with a weight representing a Hamming distance between the two of the nodes, generating the weighted graph further includes adding a node with a least Hamming distance to a next node; and; and
       in response to determining that the first block has a maximum overlapping area of duplicate data with the particular block, identifying non-overlapping data between the first block and the particular block and replacing the particular block with a reference to the first block and the identified non-overlapping data.

11. The data storage system of claim 10, wherein the method further includes:
creating a first data structure including metadata information corresponding to the I/O data, the first data structure having a plurality of fields, each field representing a particular block of the blocks of the I/O data and indicating whether the particular block has been replaced with a reference to another block.

12. The data storage system of claim 11, wherein the method further includes:
generating a second data structure including deduplication information for deduplicated I/O data, the second data structure having a plurality of fields corresponding to a value of a source index, a source offset, a source length, a destination offset, and a destination length.

13. The data storage system of claim 12, wherein the I/O data is part of an I/O request received at a first storage system, and wherein the method further includes:
replicating the I/O data to a second storage system, including transmitting the deduplicated I/O data to the second storage system; and
at the second storage system, restoring the I/O data from the deduplicated I/O data using information from the first data structure and the second data structure.

14. The data storage system of claim 13, wherein the method further includes:
compressing the deduplicated I/O data prior to transmitting the deduplicated I/O data to the second storage system such that transmitting the deduplicated I/O data includes transmitting the compressed deduplicated I/O data.

15. The data storage system of claim 14, wherein the method further includes:
transmitting the deduplicated I/O data including transmitting information regarding the deduplicated I/O data.

16. A data storage system comprising:
a first-tier system performing first level deduplication on input/output (I/O) data, wherein performing first level deduplication includes: dividing the I/O data into a plurality of blocks; determining whether any particular block is a duplicate of any other of the blocks to produce first-tier deduplicated I/O data; and replacing the any other block with a reference to the particular block resulting in the first-tier deduplicated I/O data; and
a second-tier system performing a second level deduplication on the first-tier deduplicated I/O data, wherein performing the second level deduplication includes: for each block that is not the duplicate of the any other block, determining whether the block has a maximum overlapping area of redundant data with the any other blocks, and wherein the determining that the first block has the maximum overlapping area of duplicate data includes generating a weighted graph that includes a plurality of nodes and a plurality of weighted edges, each of the nodes representing a block of the blocks of the I/O data, each of the weighted edges connecting two of the nodes and being associated with a weight representing a Hamming distance between the two of the nodes, generating the weighted graph further includes adding a node with a least Hamming distance to a next node, and in response to determining that block has the maximum overlapping area of redundant data with the any other block, identifying non-redundant data between the block and the any other block and replacing the any other block with a reference to the block and to the identified non-redundant data.

17. The data storage system of claim 16, further comprising preparing a data buffer for transmission.

18. The data storage system of claim 17, further comprising:
performing a breadth first search after generating the weighted graph to determine the maximum overlapping area of duplicate data of the particular block with the any of the other blocks, wherein performing the breadth first search includes for each pair of nodes:
determining whether a first node of the pair of nodes has a least Hamming distance with a second node of the pair of nodes; and
determining whether the first node of the pair of nodes has a least Hamming distance with a neighbor node.

19. The data storage system of claim 18, further comprising:
removing from the weighted graph the first node with a least Hamming distance with the second node or the neighbor node.

* * * * *